United States Patent [19]

Barkan et al.

[11] 3,757,322

[45] Sept. 4, 1973

[54] TRANSPARENT TOUCH CONTROLLED INTERFACE WITH INTERREACTIVELY RELATED DISPLAY

[75] Inventors: Harold Barkan; Edward D. Barkan, both of Ardsley; Jerome Swartz, Stony Brook, Long Island, all of N.Y.

[73] Assignee: Hall-Barkan Instruments, Inc., Tuckahoe, N.Y.

[22] Filed: Feb. 3, 1971

[21] Appl. No.: 112,148

[52] U.S. Cl. .................... 340/365 C, 35/6, 117/211, 35/9 B, 178/18, 317/146 R, 324/17, 340/337

[51] Int. Cl. .............................................. G08b 5/36

[58] Field of Search ............ 340/337, 365 C, 258 C, 340/253 C, 166 EL; 317/146 R; 324/17; 35/6, 9 A, 9 B; 117/211, 212; 178/18, 19, 20

[56] References Cited

UNITED STATES PATENTS

| | | | |
|---|---|---|---|
| 3,382,588 | 5/1968 | Serrell et al. | 35/9 A |
| 3,482,241 | 12/1969 | Johnson | 340/337 |
| 3,010,850 | 11/1971 | Colbert et al. | 117/211 |
| 3,501,342 | 3/1970 | Haberecht et al. | 117/212 |
| 3,401,470 | 9/1968 | Gaven | 117/211 X |
| 1,590,008 | 6/1926 | Whitmore et al. | 324/17 |
| 3,543,056 | 11/1970 | Klein | 340/258 C X |
| 3,207,905 | 9/1965 | Bray | 340/258 C X |
| 3,497,966 | 3/1970 | Gaven | 35/9 A |
| 3,516,176 | 6/1970 | Cleary et al. | 35/9 B |
| 3,244,369 | 4/1966 | Nassimbene | 340/365 C X |
| 3,530,310 | 9/1970 | Adelson et al. | 340/258 C X |

*Primary Examiner*—David L. Trafton
*Attorney*—Kirschstein, Kirschstein, Ottinger & Frank

[57] ABSTRACT

A transparent touch actuated interface with an interactively related display, in which the display is substantially fully covered by a solid state overlay, e.g., a keyboard, composed of one or more to-be-touched contact areas of electrically conductive transparent material electrically isolated from one another by transparent means and having leads extending from the contact areas to terminals connected by circuitry to a corresponding number of switches of which the areas constitute the activating elements. The switches control utilization mechanisms. The overlay and switches jointly constitute the interface. Each contact area is coextensive with a corresponding associated underlying area of the display so that the overlay and display are interreactively related and thus facilitate decision making. The leads preferably are transparent so that the entire overlay is effectively transparent and the display can be seen through it. The contact areas conjointly constitute a predominant portion of the overlay whereby to all intents and purposes each different area of the display has a different associated contact area. The nature of the display preferably is variable and may be static or kinetic, e.g., printed material or material presented on the face of a cathode ray tube or rear projection from a moving picture or slide projector or other graphic generating means. The contact areas may be transparent electrically conductive self-supporting plaques one surface of each of which is adapted to be touched, the plaques being separated by reaches of an insulating lattice. In a preferred form of the invention the contact areas are discrete thin films supported on the electrically non-conductive transparent substrate. The leads may be on either face of the substrate or embedded therein and preferably extend to the periphery of the substrate. Alternatively, the thin film areas may be mutually spaced and the leads located between the areas and covered by a preformed or an in situ formed lattice of transparent electrically non-conductive sheet material. Furthermore, the exposed surface of the overlay may be covered by a very thin electrically non-conductive film as a guard against humidity, chemical attack, physical damage and soiling. The contact areas are adapted to be touched by a person's fingers, although they also may be touched by a hand held implement, particularly, if it is desired to increase the contact density. The implement may include a visible indicating means. The interface is adapted to be connected to a utilization mechanism including a broad range of electrical devices such as computers, teaching machines, read-outs, illuminating means to light up a selected portion or portions of the display, audio/visual apparatuses and playboard means. The configurations of the contact areas and of the overlay may be of various standard shapes and sizes or can be custom tailored to special installations, but, in general, a single overlay with a standard grid consisting, for instance, of rows and columns of contact areas is designed to be used interchangeably with different display.

18 Claims, 31 Drawing Figures

INVENTORS
HAROLD BARKAN
EDWARD D. BARKAN
JEROME SWARTZ

BY [signature]
ATTORNEYS

INVENTORS
HAROLD BARKAN
EDWARD D. BARKAN
JEROME SWARTZ

BY [signature]

ATTORNEYS

INVENTORS
HAROLD BARKAN
EDWARD D. BARKAN
JEROME SWARTZ

BY [signature]

ATTORNEYS

INVENTORS
HAROLD BARKAN
EDWARD D. BARKAN
JEROME SWARTZ
BY
[signature]
ATTORNEYS

INVENTORS
HAROLD BARKAN
EDWARD D. BARKAN
JEROME SWARTZ

BY
[signature]
ATTORNEYS

TRANSPARENT TOUCH CONTROLLED INTERFACE WITH INTERREACTIVELY RELATED DISPLAY

BACKGROUND OF THE INVENTION

1. Field of the Invention

A man/machine interface in which a display is covered, optionally removably, by an overlay composed of an array of electrically conductive transparent contact areas in adjacency but electrically isolated from one another and including leads for connecting the contact areas to switches of which the areas constitute the actuating element.

2. Description of the Prior Art

All computers, regardless of their purpose, require inputs. The term "computer" as used herein has an extremely broad connotation and embraces all kinds of electrical equipment designed to perform functions such as memory storage, memory recall, teaching, selection, pedagogical reinforcement, pedagogical guidance, computation, logic, etc. Computers are basically man-controlled machines. The inputs to the computers must at least in part be furnished by human beings. Sometimes the inputs require very little in the way of reflection on the part of the human beings, for instance, the transcribing of information from columns of figures. At other times, the inputs require decision making by the human beings. Conventionally, the inputs are derived either directly or indirectly from data that is presented to the human beings, the data being in any one of many forms, e.g., figures, graphs, photographs, maps, drawings, etc.

One of the standard input devices comprising a man/machine interface is the keyboard. The degree of complexity of the keyboard will vary with the sophistication of the work to be done and of the computer, its program and its functions. Essentially, however, the keyboard constitutes many buttons, each of which is to be pushed to provide an input or portion thereof. Some of the buttons may be associated with numbers, others with letters and others with functions. The human operator, however, does not push these buttons at random but rather in accordance with a preselected scheme. For example, the operator may reach a decision after transcribing or reading from a column of numbers in which case he must punch certain buttons in a certain order which is determined by one or more numbers of the column. That is to say, the human being pushes the buttons while watching a display that is apart from the keyboard. Of course, the display may be far more complex than simple numbers, letters and functions. It may, for example, constitute a map, a graph or a diagram, and the human being reaches decisions based on this information. Such decisions may be reflected by the transcription of information on the keyboard which keyboard will be of an appropriate pattern. Also, the display may be presented in such a fashion that the human being has to make more than a simple decision. All of these decisions, whether they be the simple one of transferring a number, letter or function to the keyboard, or the more complex one of integrating in his mind the combined effect of two or more bits of information on the display before pushing an appropriate button or buttons, takes time and permits errors. Moreover, it requires the prior acquisition by the human being of the concepts of the display. Thus, a piece of information contained in a display in the English language or a decision resulting therefrom could not be transferred to the keyboard by a person who does not read English nor could the information on an even mildly sophisticated display be transferred to the keyboard by a person who is unskilled or illiterate.

Still further, the usual keyboards require depression of the buttons and, although this might be a trivial physical exertion, over the day the constant repetition of the minor effort may tire some people to the extent that their attention may wander or because of mental fatigue they may be more prone to make errors. More importantly, the act of communication by touching an area rather than pushing a button through a distance is more amenable to the ultimately conceived role of the machine as an extension of the human operator through an essentially unperceptible interface. It therefore would be quite desirable to coordinate to the maximum extent possible the interrelationship just discussed between a display and the keyboard and also to minimize the operator's effort in manipulating the keyboard.

It has been proposed to improve on the standard keyboard technique wherein the keyboard was physically remote from the display with its accompanying delay and mantal decision-making step and potential error, by using a light pen or a data tablet which at best are only partial solutions to the foregoing problems. It also has been proposed to have an opaque point contact display embedded in a plastic plate which was located at the bottom of a cathode ray tube display. This latter system does not provide the best solution to the problem because, even though there is an improvement in physical adjacency, the point contacts do not consitute areas essentially coextensive with and overlying corresponding underlying areas of the display with the combined areas of contact substantially equal in area to and coextensive with the underlying display. If such conditions were the case, the opacity of the contacts would block out the display beneath them. The contacts necessarily are opaque so that their locations will be obvious. It is to the interest of such a latter system to make the contacts as small as possible. This makes the contacts more difficult to touch and thereby slows down speed of operation and creates errors. On the other hand, if the contacts were made large to avoid such difficulties, large portions of the display would be concealed so that the functional interrelationship between different areas of the display and corresponding point contacts would be destroyed.

SUMMARY OF THE INVENTION

1. Purposes of the Invention

It is an object of the invention to provide a unique interface, inclusive of a transparent overlay, which enables a new interreactive relationship to be secured between it and a display.

More particularly, it is an object of the invention to provide a touch actuated interface which will soften, i.e., make more easy to effect, the man/machine interrelationship, particularly where visual display format is complex and/or sophisticated.

It is another object of the invention to provide an interface of the character described which greatly simplifies the tasks of the human operator, particularly for scanning, viewing, inspection and mental decision-making operations, especially for unskilled, untrained or illiterate operators.

It is another object of the invention to provide an interface of the character described which lends itself readily to high speed reflexive operation by a trained efficient operator.

It is another object of the invention to provide an interface of the character described which lends itself to or can be readily adapted for use with all conceivable types of areal displays.

It is another object of the invention to provide an interface of the character described which does not conceal a display and which provides an operator with an easily touched transparent contact area or areas of substantial extent that is or are coextensive with an associated area or areas on the display.

It is another object of the invention to provide an interface of the character described which supplies a cheap legendizing technique in which the legend is not an integral part of a switch or button but instead is beneath an optically clear electrically conductive contact structure with which a display can function as an appropriate legend or correlation, whereby legends can be readily interchanged.

It is another object of the invention to provide a high density of transparent contact areas (many contact areas per square inch) so as to be able to interrelate any given contact area with a rather small portion of a display whereby to provide where desirable a more detailed man/machine interrelationship.

It is another object of the invention to provide an interface of the character described which can be employed with monolithic integrated circuit elements that form a physical part of a touch activated overlay so that the computer and/or logic circuitry that is required can constitute a part or all of a border for a structure through which an underlying display can be visually seen whereby an operator can achieve a desired relationship between an underlying display and a transparent multiple conductive contact area overlay.

It is another object of the invention to provide an interface of the character described which is capable of a wide spectrum of uses in essentially every field that a computer can be employed, such, for example, as elementary, high school and college level teaching machines in subjects exemplified by reading, mathematics, history, English, social studies and foreign languages; a visual testing machine such, for example, as for multiple choice question testing and grading, vocabulary matching, audio-visual feedback, reading instructions, discrete arithmetical operations, automatic visual acuity testing, such testing being performed for schools, the armed services and drivers' licenses; election machines, these being particularly useful and foolproof in underdeveloped countries, e.g., industrialized African countries like Cameroon and Nigeria; large-scale security maintenance applications such as a store-side television surveillance where the display constitutes a television screen or screens showing happenings in various sections of the store to be inspected, in association with alarms to be actuated by the novel interface at a central security office; vending machines, e.g., cigarette, soda, candy, ice cream and the like, where it is possible with the novel interface to visualize the items to be sold, different ones under each transparent contact area, and also to permit rapid changes of legends and materials; automated plant operations, e.g., for control and inspection of chemical, nuclear and steel-handling facilities, machine operations and the like; machine control boards which are particularly useful for visual operations display in underdeveloped countries; in telephone systems where it is desirable to place in a consumer's home a terminal that enables a subscriber to make selections of different types, e.g., stocks or merchandise or services, from a selectively changeable display; graphic information data transmission systems; flight controls, these being of particular use in the modern, sophisticated, highly complex, three-dimensional control of inbound and outbound aircraft in heavily travelled air centers; visual display toys such as pre-school self-teaching of reading and arithmetic, with interchangeable displays for home use and more sophisticated and complex formats for nursery school applications; games such as Tic-Tac-Toe, Battleship and Show-and-Tell; commercial, educational and specialized television adaptations, for example, with the use of a finite number of standardized matrices to permit recording of audience or group responses; and monitoring of sports events.

It is another object of the invention to provide an interface of the character described which will generate a signal indicating an operator response and will provide a visual indication of this response correlated to the display format.

It is another object of the invention to provide an interface of the character described which constitutes relatively few and simple parts, is comparatively inexpensive to manufacture, is easy to maintain, and withal, is efficient, durable, reliable and versatile in operation.

Other objects of the invention will be apparent from the following description.

2. Brief Description of the Invention

In a broad sense the present invention resides in the provision of an interface that includes a transparent overlay which covers a display. By way of analogy, the overlay may be considered to be a transparent fixed keyboard, i.e., a transparent keyboard without movable parts. The overlay is in the form of an array of electrically conductive transparent contact areas which are electrically isolated from one another although disposed in mutual spaced coplanar immediate adjacency so that taken as a composite the array of contact areas essentially covers the entire display which can be seen in its entirety therethrough. (The pattern of transparent contact areas can vary widely depending on its mode of use and the pattern of the underlying display.)

The contact areas can assume various forms. Thus, they may be composed of transparent conductive plaques, the lower of whose surfaces are immediately adjacent the display area and the upper of whose surfaces are designed to be touched, the different plaques being supported and physcially and electrically separated by a lattice of electrically non-conductive material.

In another form of the invention the contact areas may be thin electrically conductive transparent films supported by an electrically non-conductive substrate such as a pane of clear glass or clear plastic, the film contact areas being discrete although close to one another. Suitable leads are included to connect each contact area to a switch of which the contact area is the actuating element. Where the array is a $1 \times N$ or $2 \times N$ matrix the leads are quite simple. They can be taken in such instances from a border of each contact area that is adjacent the periphery of the matrix.

In more sophisticated forms of matrices such as 3 × N, up to N × M, where N and M are whole numbers in excess of two, the leads to the switches are somewhat more complex because such leads must pass from an internal position to the periphery of the overlay. According to the invention this can be accomplished in various ways at acceptable lead impedance levels. For example, leads may run from internal contact areas to the periphery along the insulating spaces between the contact areas and be disposed on the same face of the substrate as the contact areas. Either the leads are extremely thin so as to be unnoticeable and essentially invisible to the human eye which is focused on the display beneath the overlay, or the leads, like the contact areas, may be transparent. Alternatively, the leads may be located on the surface of the substrate opposite to that on which the contact areas are disposed in which case portions of the leads pass through the thickness of the substrate from the sundry contact areas to the aforesaid opposite surface. These leads, too, are preferably transparent. Still again, the leads may be in the form of very thin wires laid in channels extending from the sundry contact areas to the periphery of the overlay and such wires may be so thin as to be unnoticeable or may be made of electrically conductive transparent material. In another form of the invention the leads may be imbedded in the insulating lattice or plastic pane. Leads may be provided from an orthogonal array of contact areas in an X mode on one face of the substrate and in a Y mode on the other face of the substrate so as to simplify circuitry associted with the overlay.

In one desirable form of the invention the overlay is set into a supporting frame and the frame provided with terminals to engage the ends of the leads extending from the sundry contact areas to the periphery of the overlay. This enables the overlay to be easily replaced in the frame by another overlay without changing external circuitry. Such replacement may be desirable for various reasons, chief among which are to change the arrangement of contact areas in a matrix and to change the shape of the contact areas and the matrix. Such changes may be made to secure a specific association of a given overlay with a given display.

The outer face of the transparent contact areas may be left exposed for direct touching by a human finger or a member having a similar capacitance, or, for the sake of protecting the contact areas against humidity, chemical deterioration or soil, the exposed surface of the overlay may be covered with a very thin layer of a clear electrically non-conductive material so that in effect touching of any of the contact areas through such transparent layer is the electrical equivalent of touching the exposed surface of the contact area itself.

It should be mentioned that where the leads, either wires or transparent films, are disposed on either surface of the overlay, they are protected from the possibility of inadvertent touching by covering the same with a layer of transparent electrically non-conductive material which in effect forms a border between adjacent conductive areas. The border is quite narrow in keeping with the invention so as to keep the conductive areas large and thereby having them easy to touch and associated with a maximum size of underlying portion of the display whereby the conductive areas in toto are associated with essentially the entire area of the display, and each contact area is associated with a corresponding congruent underlying area of the display, which display area nearly touches its neighbor.

The display means is located beneath the overlay. In the case where the contact areas are through and through (bulk conductive) from the to-be-touched surface to the display, the display preferably presents an electrically non-conductive surface facing the overlay and desirably, although not necessarily, in contact therewith or extremely close thereto so as to enhance the visual interreaction and minimize parallax. In the case where the contact areas are in the form of thin transparent films on a supporting transparent electrically non-conductive panel the display may be on the bottom surface of the panel (the surface remote from the contact areas).

The displays may be of any conceivable visual type. In a very crude form the display may merely consist of display markings, e.g., inscribed with a marking instrument, on the undersurface of the panel. More sophisticatedly, the display may comprise a graphic print or photographic transparency, e.g., a print on a piece of paper or cardboard or transparent plastic pellicle, and suitable means is included to hold any of these against the undersurface of the transparent panel, the contact areas being on its upper surface. In an even more sophisticated form the display surface of the transparent panel may consist of a frosted surface on which there is thrown by rear projection the material to be displayed, e.g., from a motion picture or a slide projector. It will be observed that this latter method makes it apparent that the display can be static or kinetic, depending upon the particular mode of use envisioned for the instant novel interface. The display also may constitute the panel for supporting the thin transparent film contact areas which eliminates the need for any additional panel, or the panel can be placed directly in front of the face of a cathode ray tube.

Pursuant to an ancillary feature of the invention there may be employed as an adjunct to the novel interface a convenient device for touching any selected one or series of contact areas indirectly instead of directly with an operator's finger. Such a device has various advantages. It enables the touching device to have a smaller touching zone so that a higher density of contact areas may be employed in the matrix than would be feasible where individual areas are to be touched by a human finger which is inherently gross, i.e., of a size that is large in comparison with the small point of an implement. A further advantage of such a device is that the device may include a source of light which is actuated each time that the device touches a contact area. This can be useful to allow the operator to know that a contact has been made or, by using suitable circuitry, it can make only selected contact areas available to have their associated switches energized upon touching of such areas to allow an operator to know when an incorrect area has been touched because then the light source will not be energized as by a feedback whereas it will be energized upon touching a proper contact area. It also enables a measurement to be made of the number of contact areas touched when moving the device over the overlay without lifting the device and of the rate of touching. Integrating the rate of touching will yield distance-covered information which can provide an additional input to a machine/computer. Moreover, the device can have its light source energized by the negligible energy available in the control section rather than the power section of a power control device.

The switches control a utilization means that can be of a wide variety of types, indeed, anything which is adapted to receive electrical inputs. Typical switches usable with the invention are shown, described and claimed in detail in U.S. Pat. Nos. 3,493,791; 3,530,312 and 3,530,310, and U.S. Pat. application Ser. No. 852,858, now U.S. Pat. No. 3,549,909, for TWO-WIRE SOLID STATE DIRECT TOUCH RESPONSIVE SEMICONDUCTOR SWITCH CIRCUIT, TOUCH RESPONSIVE MOMENTARY SWITCH CIRCUIT, TOUCH ACTIVATED DC SWITCH AND PROGRAMMER ARRAY, and TOUCH ACTIVATED AC FULL WAVE TWO-WIRE SWITCHES, respectively, issued Feb. 3, 1970, Sept. 22, 1970, Sept. 22, 1970 and filed Aug. 25, 1969, respectively, and owned by the assignee of the present application. However, mention should be made of the fact that, although the various switches therein described use contact means for supplying power to a load when the contact means is touched by a person or a member having the capacitance in the order of the capacitance of the human body, in a preferred form of the present invention the sensor of the signal supplied from the contact means preferably is made more sensitive than the switches shown in the aforesaid patents and patent application and, therefore, in this preferred form a current amplifier is placed ahead of the power handling sections of the switch.

The invention is essentially a softer interface between man and machine. Man's communication with a machine is a two-way process — (1) the machine presents data to the man, and (2) the man responds to the presented data with an input to the machine. The graphic display and interface of the present invention provides an effective solution to the first aspect of the problem, — the presentation of data. The interface, when used in conjunction with such a display, provides an extremely effective solution to the data input problem.

The invention resides, in essence, in an interreactive interface in the form of a transparent overlay on a display surface. The display is clearly visible through the overlay, and the operator responds to the data presented on the screen in the simplest way imaginable — that is, by touching the selected portion of the display. The location of the touch is "recognized" by the interface through its touch-activated switches, and this location recognition is translated, via the programming of the machine, into the desired input.

The following description of a typical application of the instant interface as a replacement for the standard keyboard in teaching machines will serve to clarify its use and point up its advantages:

Consider a currently marketed teaching machine with a graphic display in the form of a rear projection screen. The student is required to answer a question by choosing one of three displayed objects. In this instance, three animals are pictured, each associated with a symbol, thus:

CAT (Picture of) +
DOG (Picture of) 0
COW (Picture of) *

The question is asked — "Which animal gives us milk to drink?" The child responds by mentally selecting "COW." He observes that "COW" is associated with "*." He then shifts his attention to the keyboard below the screen — locates the key labelled "*" and pushes it to register his response. In order to complete the process he is required to a. mentally select an answer
b. be familiar with the symbols +, 0, *
c. make the association between COW and * on display screen and * on the remote keyboard
d. recognize that pushing the key labelled * represents answering the question.

In contrast, consider the same process wth the present novel interface replacing the standard keyboard and overlaying a display. The student sees the following through the overlay:

CAT (picture of)
DOG (picture of)
COW (picture of)

The question is posed — the student mentally selects "COW." He touches the picture of the cow. The machine, via the interface, recognizes his touch and interprets it as being "COW."

This example of an application of the new interface points up one of its principle advantages — that is, its usefulness in enabling the operator to make his choice (or express his decision) in a natural and direct manner, without intermediary, and essentially unrelated decision making steps. This simplification opens up a range of applications for young, illiterate, or untrained persons that could not be contemplated with existing methods. In the case of sophisticated persons, it provides the advantage of a rapid, reflex-responsive, error-free method of feeding data into the machine.

The solid-state transparent overlay which characterizes the new interface is totally free of moving parts, and consists of one or more "to-be-touched" transparent contact areas. The shape and size of the individual contact areas can be made to fit an almost unlimited variety of applications. For example, the overlay could cover an illuminated map of the United States with outlines of contact areas following the contours of the State borders. It would then be possible for a TV reporter to relate his touching of a state to some event, such as up-to-the-moment election returns from that state.

For many applications these contact areas are best arranged in the form of a grid — the individual areas being as large as desired, or with center-to-center distances as small as those of the three-fourths inch standard keyboard. For applications requiring resolutions finer than those obtainable by pointing with a finger, a probe, with or without visual feedback, is available and will permit use of the novel interface with contact areas as densely packed as 10 or more per inch. The associated solid state switches are available in different operational forms, — namely momentary, pre-set momentary, latching, and on/off.

The new interface provides a means of harnessing the logical faculties of all human beings, overcoming intercultural handicaps, and utilizing the untapped abilities of unskilled and illiterate persons. It is applicable to systems involving simple or complex, static or dynamic displays which are to be scanned or viewed, with inspection, multiple choice, or decision making operations in mind. In addition, it is particularly valuable where rapid, accurate, reflex-responsive, "gestalt" reactions are important.

The invention consists in the features of construction, combinations of elements and arrangements of parts which will be exemplified in the devices hereinafter described and of which the scope of application will be indicated in the appended claims.

BRIEF DESCRIPTION OF THE DRAWINGS

In the drawings in which are shown various possible embodiments of the invention.

Figure 17:
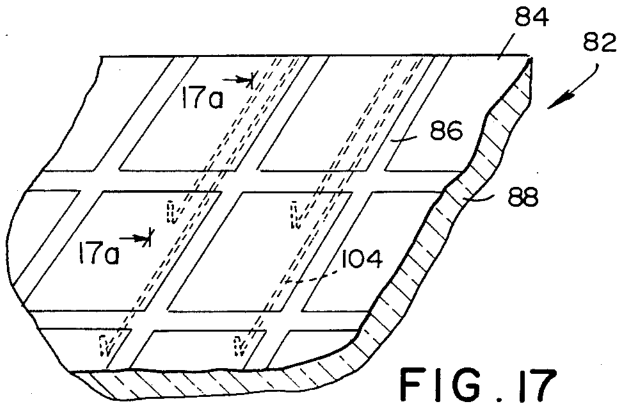
FIG. 17 is a view similar to FIG. 10, but showing an alternative structure for connecting internal contact areas to the periphery of the support.
Figure 18:
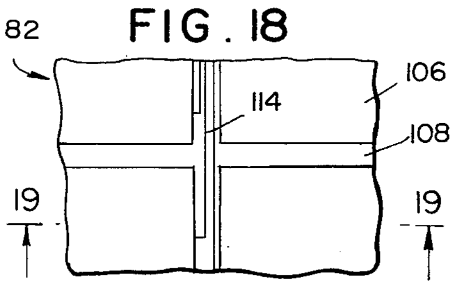
Figure 19:
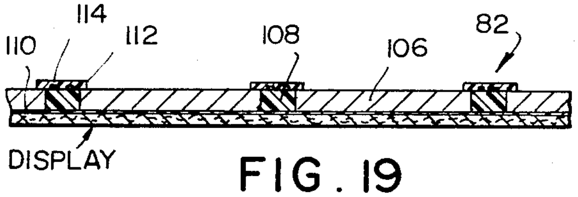
Figure 20:
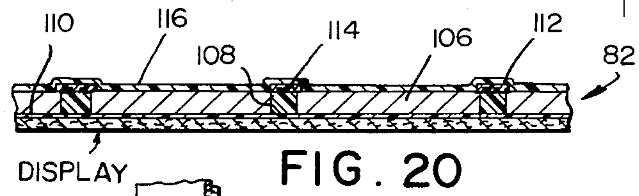
Figure 21:
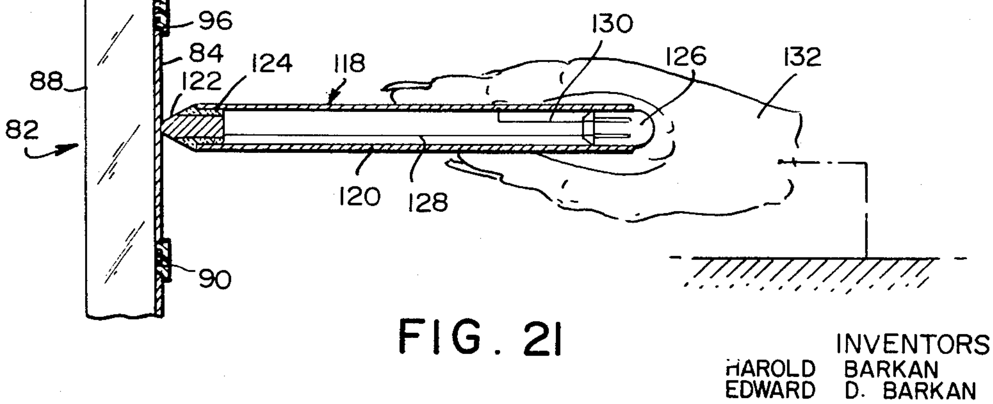
Figure 23:
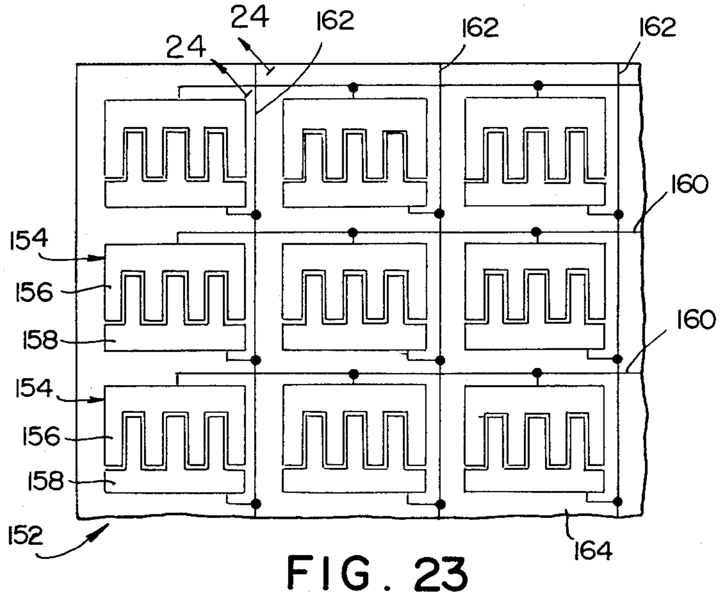
Figure 22:
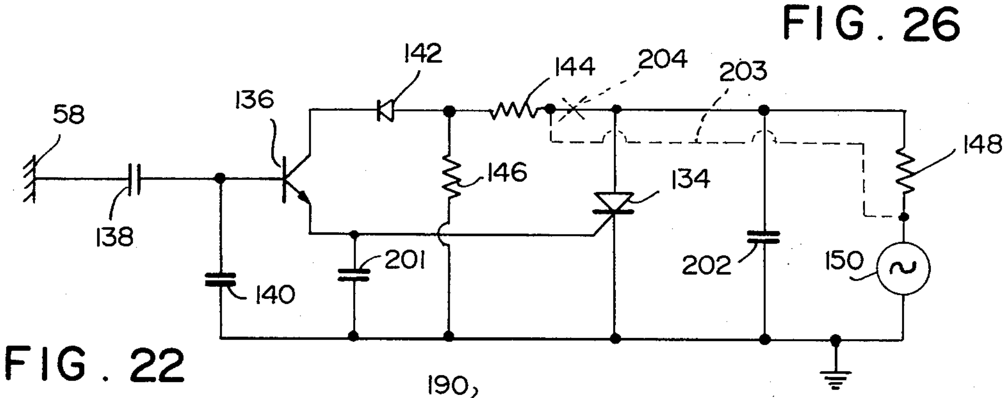

FIG. **17*a* is a fragmentary sectional view taken substantially along the line 17*a*—17*a* of FIG. 17**;

FIG. 18 is a top view of a portion of an interface illustrating another embodiment of the invention in which the conductive contact areas have their undersides expssed to the display;

FIG. 19 is a sectional view taken substantially along the line 19—19 of FIG. 18;

FIG. 20 is a view similar to FIG. 19 illustrating a further modification in which the exposed surfaces of the contact areas are covered with a very thin transparent electrically non-conductive film;

FIG. 21 is an axial sectional view through a contact area touching device which embodies an ancillary feature of the present invention;

FIG. 22 is a circuit diagram of a form of a touch activated switch that can be used with each of the conductive areas described above, said switch being characterized by a particularly high degree of sensitivity;

FIG. 23 is a fragmentary plan view of an overlay wherein the contact areas are individually subdivided and provided with leads for use in connection with an *X*, *Y* matrix technique.

Figure 24:
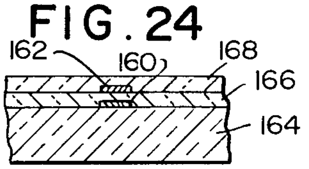
Figure 25:
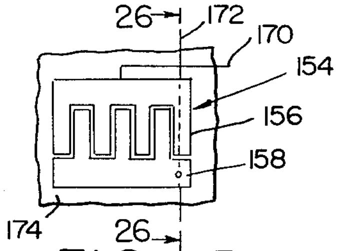
Figure 26:
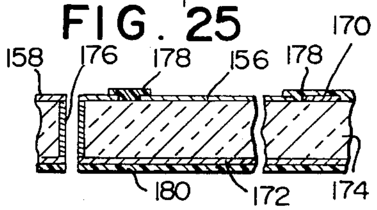
Figure 28:
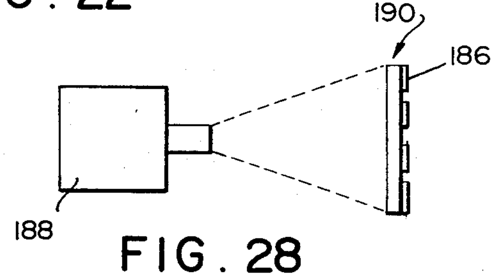
Figure 27:
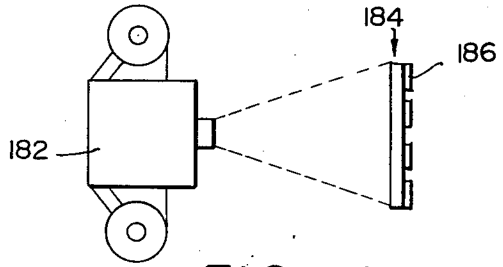
Figure 29:
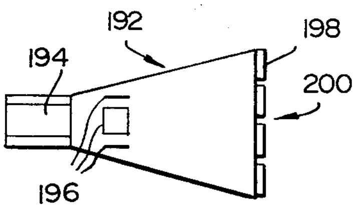
Figure 30:
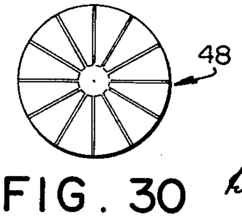

FIG. 24 is an enlarged sectional view taken substantially along the line 24—24 of FIG. 23;

FIG. 25 is a plan view of a single subdivided contact area of an overlay provided with a different form of leads for use in connection with an *X*, *Y* matrix technique;

FIG. 26 is an enlarged sectional view taken substantially along the line 26—26 of FIG. 25;

FIG. 27 is a schematic illustration of the new interface showing a display cast on the rear surface of the overlay by a moving picture projector;

FIG. 28 is a schematic illustration of the new interface showing a display cast on the rear surface of the overlay by a still projector;

FIG. 29 is a view similar to FIG. 22 and FIG. 23, but showing the display in the form of a cathode ray tube the front wall of which forms the pane for supporting the transparent contact areas; and FIG. 30 is a plan view of an overlay with the contact areas arranged in a sectorial pattern.

DESCRIPTION OF THE PREFERRED EMBODIMENTS

Figure 1:
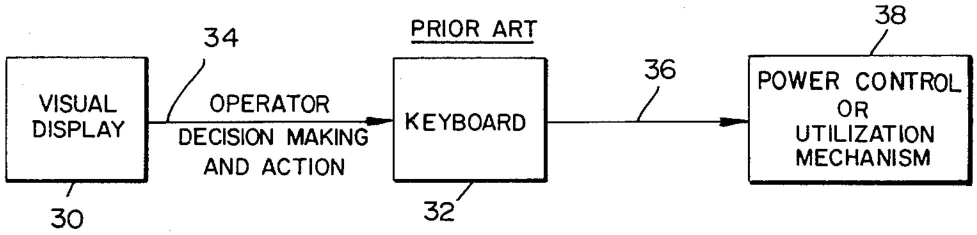
FIG. 1 is a block diagram illustrating a typical prior art configuration employing a visual display and keyboard remote from one another.

Turning now in detail to the drawings, FIG. 1 constitutes a block diagram which schematically shows the physical relationship of a typical prior art keyboard and display. The reference numeral 30 indicates a visual display. The display may constitute a map, or a radar display at an aircraft control tower, or a radar display at a defense wallboard or textual material in the form, for instance, of problems which may or may not be accompanied by choices of answers, or it may be printed material or material written by an electron gun on the face of a cathode ray tube or an image projected from a still or motion picture projector, or the material may even constitute arrays of figures or equations or functions which may be taken from any kind of data supply.

The reference numeral 32 denotes a keyboard which may be of the alpha numerical type and which may also include function or programming or mode buttons. The symbols or indicia variously associated with the different buttons and the arrangements of the buttons on the keyboard will depend upon the type of visual display with which the keyboard is to be used and the type of outputs desired to be fed from the keyboard. The visual display and the keyboard heretofore have been remote from one another in the sense that the visual display was not in back of the keyboard and visible through the keyboard, so that heretofore the operator had to assimilate information on the visual display, make a decision and then manipulate the keyboard in accordance with his decision. Various kinds of decisions could be made. The decision could be as unsophisticated as merely reading textual material on the visual display and then typing it on the keyboard, or it might involve a simple arithmetical problem like "two times two" and the result would be punched into the keyboard as "four." Because the visual display and keyboard were apart from one another the operator had to transfer his attention back and forth between the display and the keyboard, at least until the operator's manipulation of the keyboard became automatic such as a typist's operation of a typewriter. This type of operator mental/physical link 34 between a remote visual display and a keyboard led to errors in feeding information from the display to the keyboard and also increased the difficulty of decision making because the display and the keyboard were not so interrelated as to physically assist the operator in his decision making. For example, if the display were a radar screen at an airport traffic control tower, the operator, after looking at the display, might have to make a decision as to which of several aircraft was to be given priority in landing or assigned a certain altitude level. This decision would be made after looking at the visual display and then the decision would be inscribed as an input to the keyboard. In such a process, the operator would not be aided by the keyboard in making the decision.

In the prior art just described the keyboard was connected by an electrical link 36 to a power control or utilization mechanism 38. The purpose of the power control was to amplify the signal received from the keyboard and, in turn, to operate a utilization mechanism. The utilization mechanism basically was a computer with an output which might be optical or graphic or control a piece or pieces of equipment. Thus, the utilization mechanism might simply constitute a logic circuit and a display or a proper answer if the computer is a teaching machine, or the computer might be a mechanism for opening a communication link to a selected aircraft which the operator has picked out on the keyboard as a result of his making of a decision following inspection of a visual display, or the utilization mechanism might constitute a set of valves which are to be opened or closed in a chemical processing plant as a result of decision inputs to the keyboard made by the operator after looking at the visual display. In like manner the utilization mechanism could constitute control switches in an electrical power grid which switches are to opened or closed by manipulation of the keyboard after operator inspection of the visual display. It is to be understood that these examples of utilization mechanisms are but a small number of a multitude of utilization mechanisms which basically are computers ranging from extremely simple forms to forms of a highly complex nature.

The present invention avoids the difficulties inherent in keyboards/visual displays such as those exemplified in FIG. 1. However, before detailing the present invention it should be mentioned that other forms of interfaces have been proposed to assist an operator, none of these, however, as soon will be appreciated achieving the highly advantageous results of the unique interface of the instant invention. Thus, it has been proposed to use light pens and data tablets as well as point contact matrices. All of these have been mentioned in a preceding portion of this specification.

Figure 2:
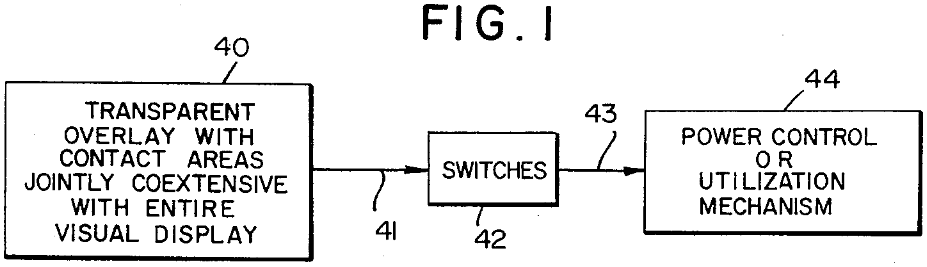
FIG. 2 is a similar block diagram illustrating the new interface with a transparent overlay covering an underlying visual display.

FIG. 2,like FIG. 1, is a block diagram. However, FIG. 2 is a block diagram of an interface embodying the present invention as part of a system including a utilization mechanism. More particularly, the reference numeral 40 denotes the overlay of the new interface which is connected by an electrical link 41 to switches 42 of which the contact areas of the overlay are the actuating elements. The switches are connected by an electrical link 43 to a power control or utilization mechanism 44. Essentially, the new interface constitutes a transparent overlay (made up of electrically discrete contact areas) covering a visual display so that substantially the entire area of the visual display, i.e., so much of the visual display as is intended to be used for information on the basis of which the overlay is to be manipulated, can be seen through the overlay. There are essentially no opaque physical impediments over, under or part of the overlay which will prevent an operator from seeing the entire visual display. The overlay is composed of contact areas (equivalent to prior art push buttons of a keyboard) which are disposed in immediate adjacency to one another, i.e., contact areas which are separated by short distances from one another, the distances being short in relation to the broad surface dimensions of the contact areas. A typical but not a limitative linear dimensional ratio is 100:1 in a line extending along a row or column of contact areas. The contact areas are electrically conductive. However, they are transparent. Typical transparent conductive materials will be mentioned hereinafter. The electrically conductive contact areas are mutually separated from one another by electrically nonconductive barriers, the areas and barriers being of various physical forms which will be described in detail hereinafter. The barriers likewise are transparent so as not to interfere with the operator's view of the entire visual display.

Each electrically conductive transparent contact area directly covers a certain portion of the visual display with which it is coextensive and with which it, therefore, is associated for purposes of operator manipulation of the overlay. Inasmuch as the contact areas constitute a predominant portion of the overlay, essentially the entire visual display is subdivided into distinct areas each of which has associated with it a different contact area.

The contact areas preferably are flat and their contact surfaces are coplanar. The associated circuitry is such that any contact area will, upon touching a human finger of an element having a capacitance in the order of that of a human being, actuate the associated switch, and, through that, a utilization mechanism.

In order to provide circuit connection between the transparent predominantly contact-areaed keyboard and the switches of which the areas are the actuating elements, in the forms of the inventions illustrated in the accompanying drawings, a different lead has one end connected to each different one of the transparent conductive contact areas and the other end of each lead extends to the perimeter of the keyboard from which electrical connections are made via the electrical link 42.

As will be seen hereinafter, where the array (matrix) of contact areas includes no more than two columns or two rows in an orthogonal arrangement, the connection of the leads to the contact areas is, in essence, rudimentary. The leads simply have to run from a portion of the periphery of each contact area adjacent such periphery to the perimeter of the overlay. When the array is more complex and includes transparent conductive contact areas separated from the perimeter of the overlay by other conductive contact areas which run along the perimeter of the keyboard, special constructions of leads are employed which in each instance have one end connected to a conductive transparent contact area and the other end physically located adjacent the perimeter of the keyboard. Various arrangements of leads will be described in detail hereinafter.

The leads can be formed of transparent electrically conductive material which may be the same as the material of the transparent conductive contact areas in which case they, too, are transparent and present no hindrance to the operator's view of the underlying entire visual display. In an alternate form of the invention very thin opaque wire-type leads are used, these being so thin that they present no noticeable hindrance to the operator's view of the entire visual display, particularly since the overlay is of finite thickness and the display is beneath the overlay so that, bearing in mind the thinness of the leads, the leads are slightly out of focus for the operator's eyes which are concentrated on the visual display, thereby rendering the leads even less noticeable visually. This is the same effect as looking through a wire screen at a remote object, the effect being enhanced because of the thinness of the leads used. The leads may be on either surface of the overlay in which case they are covered by a transparent electrically non-conductive film layer or coating, or embedded in the overlay, all of these variations being shown in the accompanying drawings and described hereinafter.

The transparent conductive contact areas, and the leads,if on a surface of the supporting substrate, may be in the form of thin films created, for instance, by sputtering or vacuum evaporation deposit techniques, or the said contact areas can be in the form of plaques that are thick enough to be self-form-maintaining and therefore not require a supporting substrate. Such plaques extend from the front to the back of the overlay and are set into the openings of a lattice of transparent electrically non-conductive material.

The conductive areas are designed to be touched and their associated switch circuits energized thereby, the touch being that of a human finger or an element having a capacitance in the order of that of a human being or an element having a resistance in the order of that of a human finger. The contact with the finger or element may either be a direct touching contact or may be through the medium of a very thin film, e.g., 100 micro inches or less, of a transparent electrically non-conductive material which can cover the upper surface of the overlay including the insulating boundaries between the contact areas and the protective layers over transparent leads and which film is so thin that a touching of the same by a finger or equivalent element is electrically indistinguishable from direct contact so that the film does not cause the conductive contact areas or their associated switches to function as capacitor switches.

It will be appreciated from the foregoing generalized description of the interface embodied in the present invention that the overlay and the visual display, although interrelated, are functionally separate and electrically different elements, although in some instances the support for the transparent conductive contact areas may also have one surface thereof, the surface remote from said areas, act as the display means.

Figure 3:
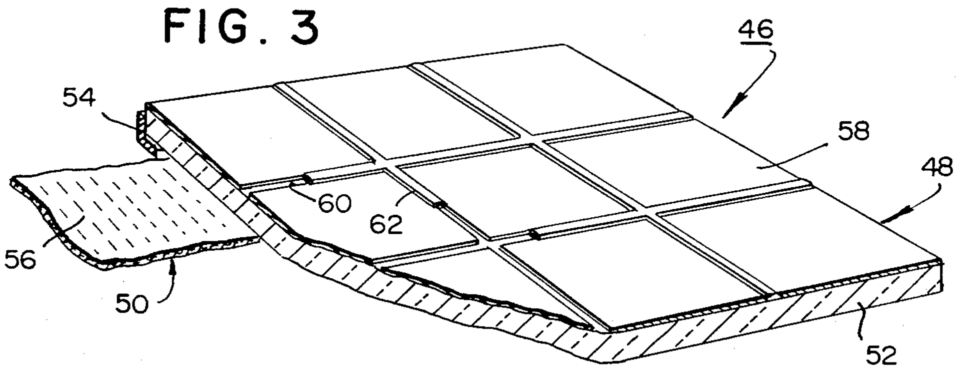
FIG. 3 is a fragmentary perspective partially broken away view of an overlay embodying one form of the invention, certain components of the overlay being shown disproportionately thick for the sake of clarity, e.g., leads and barrier layers.

In FIG. 3 there is shown in detail one specific embodiment of an interface 46 constructed in accordance with the present invention, this interface including the principal elements above described each of which is shown as being of a specific form. Other forms for the different elements will be subsequently described.

Said interface comprises an overlay 48 and a visual display 50, the overlay being transparent so that the entire visual display can be seen therethrough with no noticeable hindrance to view. The overlay includes a flat support (substrate) in the form of a pane 52.

The pane is self-form-maintaining and stiff, although it is within the scope of the invention, in the event that the pane is to be shaped out of flat as,for example, to accommodate itself to a curved front surface of a cathode ray tube having such a surface, or to be spherical, for the pane to be flexible. For most applications the pane is essentially flat and rigid although any three-dimensional shape is within the scope of the invention. The transparent material of which it is formed is clear glass or clear plastic, preferably a plastic with good light transmitting qualities such, for instance, as an acrylic resin. The pane is of sheet material, that is to say, of uniform thickness, and is relatively thin, being thick enough to be self-form-maintaining but not so thick as to be unduly heavy or unduly clumsy. A typical thickness is 1/32 to ¼ inch. The pane is electrically non-conductive.

The pane has associated with it a display supporting means 54 such, for example, as L-shaped elongated angles, one flange of which is secured, for instance, with an adhesive to one edge of the pane while the other flange underlies and is parallel to and spaced a short distance from the undersurface of the pane along a peripheral zone thereof. Two such angles are provided at opposite parallel edges of the pane and between them the angles define a pair of tracks to slidably receive the visual display 50 which may constitute, for example, a cardboard or paste-board sheet having display material 56 imprinted on the surface that faces the undersurface of the pane 52. In this fashion the visual display may be slipped out and another visual display containing other material that is to be used substituted for it. Other forms of visual displays will be described hereinafter. It is sufficient at this point to say that the interface 46 includes a display means which can be seen through a transparent overlay and which is located close to the undersurface of the overlay, optionally in contact therewith. The display means is in proximate relationship to the overlay, thus minimizing parallax and creating a sense of close proximity between the display means and the overlay so that to the operator they seem to be a unitary device although, actually, they are functionally and physically separate.

On the upper surface of the overlay there is provided an array of contact areas 58. The particular plan configuration and size and grouping of the areas may vary widely from application to application and can depend upon the particular functions the overlay is to serve and the type of visual display associated with the overlay in the terminal.

There is shown in FIG. 3 a typical array of contact areas which may be used for a multitude of purposes. This array is an orthogonal array, which is to say, rows and columns of contact areas in an orthogonal pattern, each of the contact areas being a square. Merely by way of example and without in any fashion constituting a limitation upon the invention, in one typical keyboard the contact areas are 1½ × 1½ inch. The contact areas of the aforesaid configuration are arranged with their sides mutually parallel to one another to define parallel gaps 60 therebetween, a typical gap for the aforesaid size of contact area being in the range of fifteen thousandths to fifty thousandths of an inch wide. Contact areas of this size are readily adapted to be touched by a finger. Optionally, the density of the contact areas may be made much greater by employing smaller dimensions for each contact area and in practice the density of contact areas will be tailored to the range of uses or type of display means.

All of the contact areas are transparent. Any degree of transparency which will permit the visual display to be readily seen therethrough is acceptable. A good light transmittance for use in carrying out this invention is 70 percent. A practical lower limit of light transparency is 40 percent. However, the invention will function with even lower light transmittances, e.g., as low as 10 percent. With such low degree of transmittance it is preferable to have high contrast visual displays or illuminated visual displays. Note should be made at this point that the visual display does not have to be permanent, i.e., steadily visible, it being within the scope of the invention to provide visual display which can flash on and off over the entire area of the visual display or for only segments thereof, depending upon the particular use to which the interface and its associated utilization mechanism is to be put. Thus, simply by way of illustration, the terminal may be used as part of a tachistoscope which desirably exposes all or changing selected parts of a visual display for only brief periods of time and is blanked out between such periods.

The contact areas 58 are electrically conductive and, since they must also be transparent, are, in the described embodiment of the invention, extremely thin. Preferably they are in the form of thin films and are emplaced by any well known thin film technique such, for instance, as sputtering or vacuum evaporation procedures. The films are extremely thin in order to provide the desirable transmittance, a typical thickness being in the order of five to ten millionths of an inch. Materials which can be used for such films are chromium, rhodium, tin oxide, zinc oxide, lead oxide and magnesium oxide. The films are deposited through a stencil which protects the portions of the pane 52 that are to be free of the conductive films during the period of deposition. An alternate method of creating the transparent conductive areas is to provide a transparent dye electric substrate such as glass with a transparent conductive coating over its entire area and then, with the use of a resist/etching technique or other equivalent technique to remove the portions of the coating between the conductive areas and leads which are left on the substrate, the end result being an overlay functionally identical to that described at length above.

In FIG. 3 the thickness of the contact areas has been exaggerated in order not to show them as lines, i.e., for clarity of illustration; that is to say, their thicknesses are disproportionate to the thickness of the other elements shown such, for instance, as the supproting pane 52 and the visual display 50.

The spaces 60 between adjacent edges of the contact areas can be themselves, because they bear no conductive film, serve as transparent barriers between adjacent contact areas. Nevertheless, it is preferred to have a more positive barrier and, therefore, there is shown in FIG. 3 a lattice 62 in the form of a thin sheet of transparent electrically non-conductive material such, for instance, as a synthetic plastic, e.g., an acrylic resin, or silicon monoxide, having openings therein which expose the contact areas. The barriers may be slightly higher than the contact areas, the difference in heights being exaggerated in FIG. 3. The barrier lattice as illustrated in FIG. 3 is a preformed thin (e.g., 1 mil thick) layer or film of electrically non-conductive synthetic plastic which is applied after the contact areas have been deposited as a matter of convenience although this sequence is not of critical importance. The lattice is held to the upper surface of the pane 52 by a transparent cement such as an acrylic cement. The lattice also may be deposited by spraying an electrically non-conductive transparent film around the contact areas which, in this event, are suitably masked during such spraying. The lattice provides openings through which the contact areas are exposed. These openings may precisely register with the borders of the contact areas or may slightly overlap the marginal edges thereof.

No leads to the contact areas have been shown in FIG. 3 although leads obviously are necessary. The leads will be shown and described with respect to subsequent figures. As previously observed, leads extend from the contact areas to the perimeter of the pane 52 for electrical connection to associated circuitry, the leads where they are located on the keyboard being such that they are essentially transparent, being composed either of transparent electrically conductive material, the smae as that of the contact areas, or of very thin wires that can run through channels in either surface of the pane (substrate) or can be imbedded in the pane.

Figure 4:
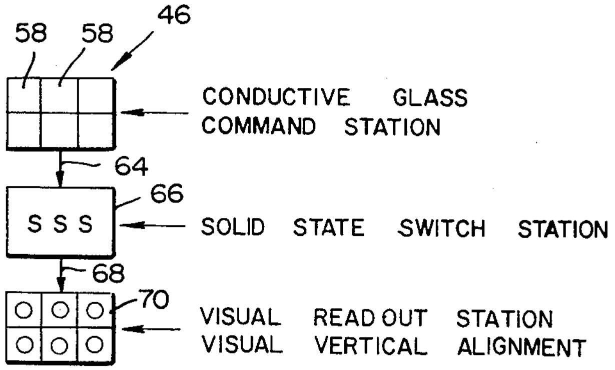
FIG. 4 is a block diagram illustrating one simple form of device utilizing the novel interface.

In FIG. 4 there is illustrated a simple use of the interface 46. The interface has been shown in diagramatic form on a scale so small that the gaps between the contact areas 58 are delineated simply as lines. The interface 46 illustrated in FIG. 4 is a 2 × 3 matrix with an underlying visual display. The leads therefrom run via an electric link 64 to a solid state switch station 66 constituting a power handling or control device such, for instance, as a plurality of any of the switches shown in the aforementioned, U.S. Pat. Nos. 3,493,791; 3,530,312 and 3,530,310 and U.S. Pat. application Ser. No. 852,858, the contact areas of the interface constituting the antennae (actuating elements) of such switches. The function of the station 66 is to provide power outputs from the very small energy inputs that are supplied when any one or more of the contact areas are touched by a finger or an element having a capacitance in the order of that of a human being. For example, station 66 may contain six such switches each of which will provide an output of sufficient power to energize a utilization device when the corresponding contact area is touched. The solid state switch station 66 is connected by an electric link 68 to a utilization device 70 which is shown in the illustrated example as a visual read-out station constituting six glow devices such as neon lamps. Each one of the six switches in the station 66 is connected to a different one of the glow devices of which there are six in the utilization device 70. In the particular device illustrated in FIG. 4 the glow devices are so physically arranged as to be in pairs that are in vertical alignment for certain non-aligned preselected pairs of contact areas. The purpose of this will be apparent from inspection of FIG. 5 which is an enlarged plan view of the interface 46 shown in a small scale in FIG. 4.

Figure 5:
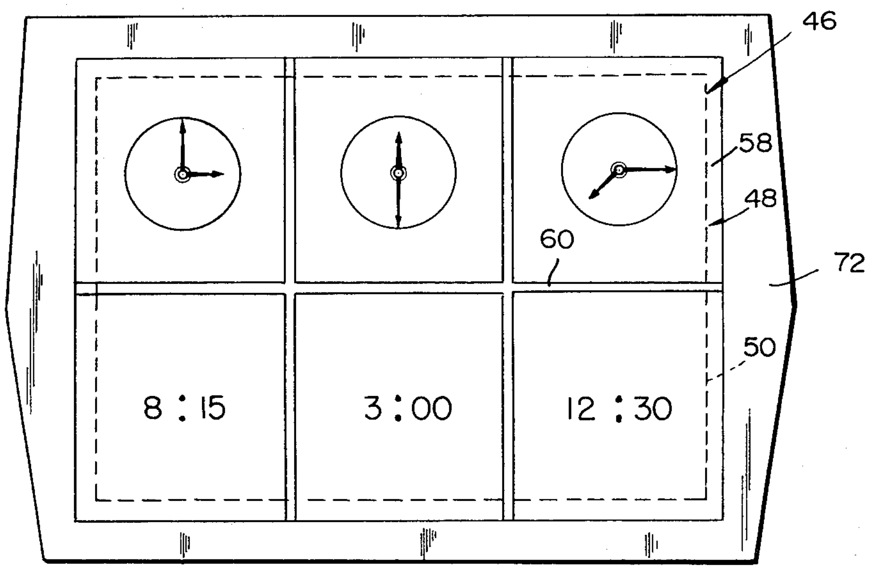
FIG. 5 is an enlarged plan view of the overlay shown in FIG. 4.

As will be apparent from FIG. 5 the overlay 48 is provided with six contact areas 58 arranged in rows of three and columns of two. The contact areas are separated by gaps 60. Here, too, the leads have been omitted because they are so tiny that their showing would distort the figure. The visual display 50 beneath the overlay 48 is subdivided into six areas. The display 50 beneath the overlay 48 is substantially coextensive with the overlay and is subdivided into six areas each beneath and coextensive with a different one of the contact areas 58.

The three areas of the display in the top row contitute three representations of clock faces each having the clock hands so arranged as to indicate different times. Thus, the left-hand clock face shows 3:00 o'clock, the central clock face, 12:30 and the right-hand clock face 8:15. The bottom row of three areas of the display material constitutes numerical figures indicating different times, these being, reading from left to right 8:15, 3:00 and 12:30. It will be observed that the areas in any given column have no correspondence between the positions of the clock hands and the numerical indication of the times. Thus, the 3:00 o'clock clock hands have the time reading 8:15 beneath them, the 12:30 clock hands have the time reading 3:00 beneath them, and the 8:15 clock hands have the time reading 12:30 beneath them.

The overlay 48 shown in FIG. 5 is the overlay for a teaching machine which is designed to teach a child how to read time. After sufficient preparatory work the machine tests the child's ability to read time and also to read numbers. Thus, a child is supposed to touch two of the contact areas, one in the clock face row and the other in the time numeral row. More particularly, if a child touches the clock face showing 3:00 o'clock he should concurrently therewith or in succession touch the time numerals showing 3:00 o'clock. When he does this the visual read-out station 70 will have two glow tubes energized through the solid state switch station 64, the glow tubes being physically located one above the other as a vertically matched pair. The child will be told that when he touches the proper associated pair of contact areas a pair of glow tubes in the utilization mechanism 70 will be illuminated in a vertical alignment.

This very simple teaching machine has been illustrated and described solely by way of example and it will be appreciated that far more complex and sophisticated interfaces and utilization devices are within the scope of the invention.

It will be noted that the overlay 46 in FIG. 5 has been shown as carried by a supporting frame 72 which is provided with a recess, the perimeter of which constitutes a seat that receives the pane 52 of the keyboard 48, the visual display 50 being located beneath the overlay in the recess provided by the supporting frame 72.

Figures 6, 7, 8:
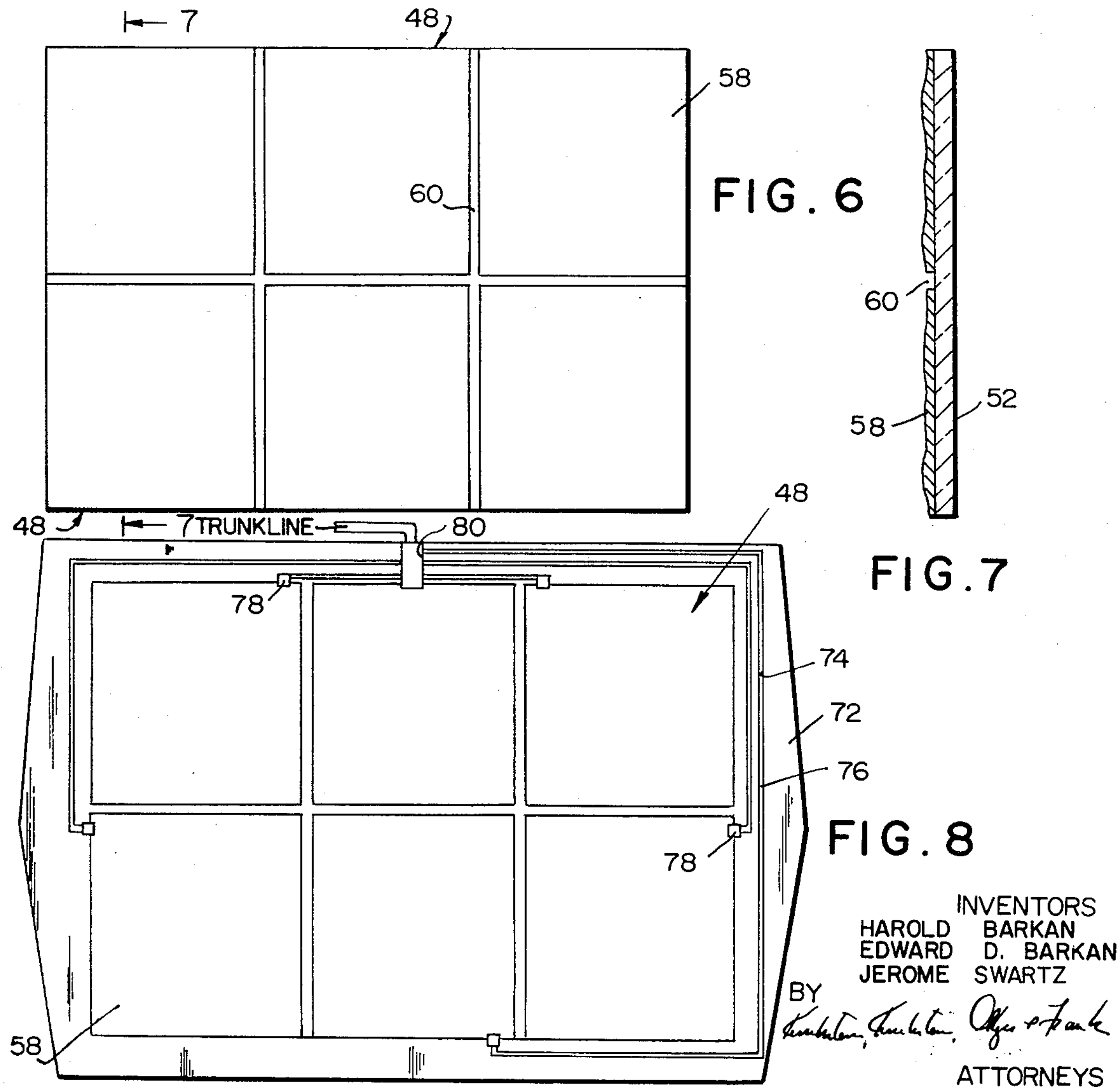
FIG. 6 is a plan view of the contact areas and supporting panel of the overlay separated from the supporting frame.
FIG. 7 is a fragmentary vertical sectional view taken subsrantially along the line 7—7 of FIG. 6.
FIG. 8 is a view similar to FIG. 5 additionally showing one method of providing circuit connections to the contact areas.

In FIG. 6 the overlay 48 has been shown apart from the supporting frame 72 and the visual display 50. The transparent contact touch areas 58 in the 3 × 2 array can clearly be seen as can the gaps 60 between the contact areas. In the specific device shown the contact areas are 1⅝ × 1⅝" and the spaces between them are from 0.015 to 0.050inch. The contact areas are formed by a vacuum evaporation deposition technique from any one of the materials previously mentioned which are electrically conductive and transparent in very thin films, to wit, chromium, rhodium, tin oxide, zinc oxide, lead oxide and magnesium oxide, with a thickness in the order of one to forty millionths of an inch.

The contact areas 58 have their thicknesses exaggerated in the section of FIG. 7, i.e., exaggerated with respect to the thickness of the pane 52 and the gap 60. It will be observed that the contact areas 58 have their borders, which are juxtaposed to the borders of the pane, coincident with the borders of the pane; that is to say, the contact areas extend to the perimeter of the pane. This is done in an array not including more than either two rows and/or columns, i.e., in an array in which there are no internal contact areas, in order to simplify connection of these areas to the external circuitry, e.g., via the electric link 64.

In FIG. 8 there is illustrated one arrangement for providing circuit connections to the sundry contact areas having a simple array of the foregoing character. The supporting frame 72 carries the circuit connections. Specifically, the supporting frame which is made of electrically non-conductive material such, for instance, as an opaque synthetic thermoplastic, is formed with a series of channels 74 on the surface thereof having the recess that receives the overlay 48 with the conductive areas 58. Each channel has one end thereof extending from a portion of the perimeter of the recess located adjacent a different one of the contact areas 58. Each channel contains a different wire 76 that terminates adjacent the associated contact area in a metal foil tab 78 that extends slightly over the exposed area adjacent a peripheral edge thereof, the extension being so small as to not interfere with inspection of the underlying visual display. If the overlay is permanently set in place in the frame, the metal tabs can be welded or soldered to the associated contact areas, and if the overlay is to be replaceable, the metal tabs only resiliently engage the associated contact areas.

The sundry wires 76 run through the channels to an exit channel 80, this latter channel also containing another wire for one of the contact areas immediately adjacent the same. Thereby a trunk line, containing in this instance six wires, leads away from the overlay 48 for connection to the solid state switching station 66. It will be apparent that the particular arrangement shown for providing certain connections for said overlay 48 is only one of many which will be readily apparent to those skilled in the art, the present invention residing not in the particular mode of circuit connections in a simple matrix not exceeding either two rows and two columns of contact areas because the circuit connections in this case do not have to be contained within the overlay itself and, hence, will not interfere with visual inspection of the display.

Another pattern of contact areas is illustrated in FIG. 30 wherein the contact areas of overlay 48 are shown as being sectorially arrayed to conjointly define a circular outline.

Figure 9:
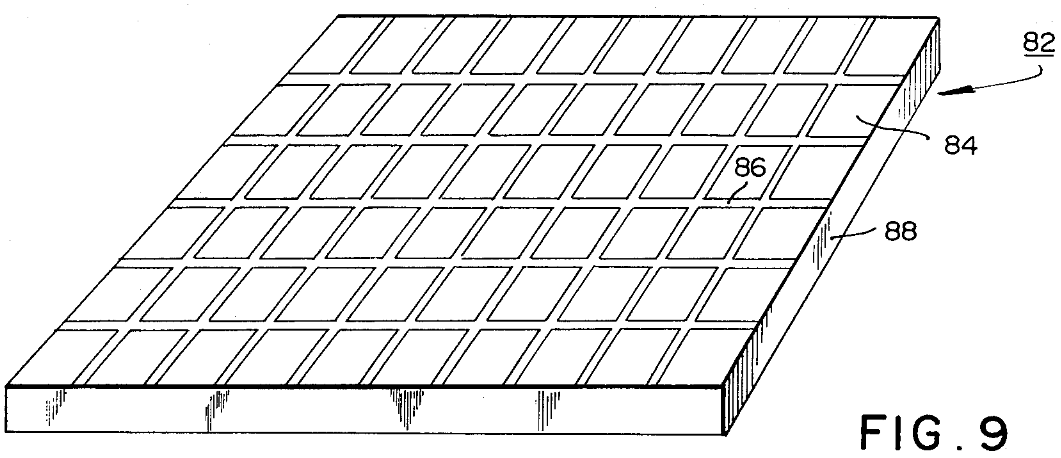
FIG. 9 is a perspective view showing a contact array with internal contact areas, that is to say, areas spaced inwardly from the periphery of the matrix of areas.

Typifying a more sophisticated overlay is the overlay 82 shown in FIG. 9. This overlay contains many rows and columns of contact areas 84 all of which are, as previously described, transparent and electrically conductive, presenting surfaces which are broad in comparison with the spaces 86 between them although the spaces have been shown with their width exaggerated so that they can be seen in this figure. Such an arrangement obviously contains marginal (border) rows and columns of contact areas, these being contact areas which are disposed adjacent the perimeter of the tranparent pane 88 that forms the substrate for supporting the contact areas, and also internal contact areas, these being areas which are spaced from the perimeter of the overlay by the marginally disposed contact areas. Such an overlay is exemplificative of the large number of contact areas which can be provided when the same are needed in connection with a particular display or a particular mode of use of the interface. Such an overlay might be used, for example, to cover a radar display at an airport traffic control center, the positions of the airplanes being indicated by moving spots of light that constitute a visual display and which are disposed immediately beneath the overlay 82. If, for example, a controller at the airport tower wants to place himself in voice communication with a particular airplane, he touches his finger to the overlay at the location whereat the blip of light corresponding to the airplane is positioned. This contact will energize a specific switch which, in turn, will energize a voice channel in a utilization device which channel is the proper one to enter into voice communication with the selected airplane. The simple arrangement of circuit connections shown in FIG. 8 cannot be employed for the overlay 82 due to the presence of the many internal contact areas.

Figure 10:
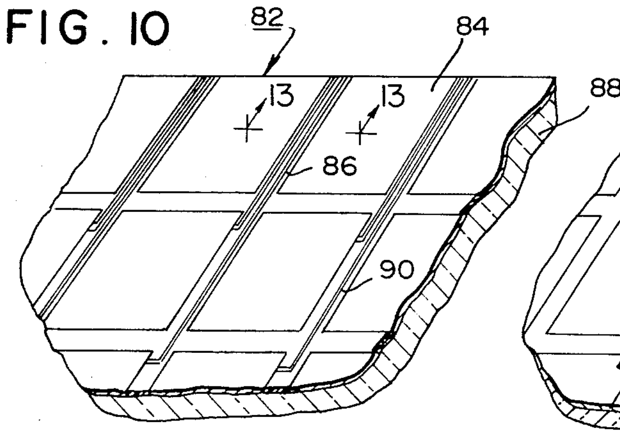
FIG. 10 is an enlarged view of a portion of FIG. 9 showing one method of providing leads from internal contact areas to the periphery of the supporting panel.

Various systems for providing suitable leads running from the different contact areas, including the internal contact areas, to the perimeter of the overlay are described with respect to the following figures, the leads being omitted from FIG. 9 because their presence would unduly complicate the figure. One such arrangement is shown in FIG. 10 which is a plan view of a fragment of the overlay 82, the fragment being sufficiently large to include some contact areas 84 adjacent the border of the overlay and other contact areas which are internal contact areas spaced from said border by marginal contact areas. The marginal contact areas are connected to switches which, in turn, are connected to the utilization device in a manner such as shown in FIG. 8, or by wires permanently connected, e.g., by soldering or welding, to edge portions of the marginal contact areas that are coincident with the border of the underlying substrate. As to the inner contact areas, leads 90 are provided each of which has one end located at the border of the overlay. This other end is connected as by wires (not shown) to the switches that control a utilization device. The construction of these leads must be such that the leads do not interfere with clear vision of the underlying display through the transparent overlay.

The leads 90 illustrated in FIG. 10 constitute deposited films of electrically conductive transparent material which preferably is the same as the films which make up the contact areas 84, and, therefore, may be deposited in the same operation as that which deposits the films that form these contact areas, for instance, by vacuum evaporation deposition through a stencil. The leads are physically disposed on the same surface of the substrate as the contact areas and extend from the contact areas along the spaces 86. The leads can be very narrow, e.g., 0.002 inch, and are spaced apart from one another so as not to be in electrical contact with each other. The spaces 86 in FIG. 10 have been shown disproportionately wide with respect to the linear dimensions of the contact areas simply for the purpose of illustration so that the leads would not appear to be unduly crowded in the drawings; however, in an actual overlay the leads are sufficiently thin to be easily accommodated in the narrow but wider spaces 86. Thus, it has been previously mentioned that these spaces in a typical example are 0.015 inch in width. With leads of 0.002 inch in width several leads can be accommodated side by side in the spaces.

Figure 13:
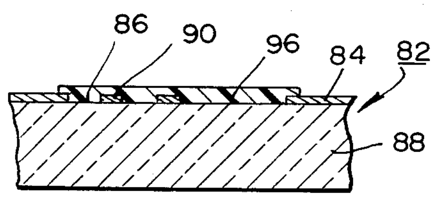
FIG. 13 is a fragmentary sectional view taken substantially along the line 13—13 of FIG. 10 and showing one structure for effecting an isolating barrier between adjacent contact areas.

It will be apparent that the leads should be protected from contact by a finger or equivalent in order to limit the effect of touching a particular contact area to the touching of that area itself and not touching of a lead associated with another area. Hence, the leads are covered as by the lattice 62 previously mentioned in connection with FIG. 3, this being a clear electrically non-conductive overlay that acts as a barrier layer between adjacent contact areas as well as physical and insulative protection for the underlying transparent leads. Said lattice is seen in FIG. 13 but not in FIG. 10 from which it has been omitted in order to avoid confusion.

Figure 11:
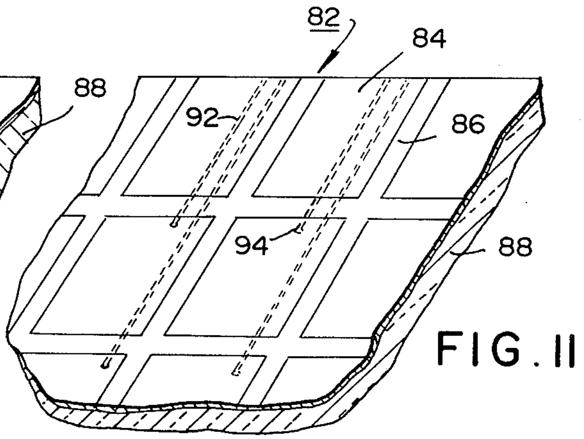
FIG. 11 is a view similar to FIG. 10, but showing another method of providing the aforesaid leads.
Figure 12:
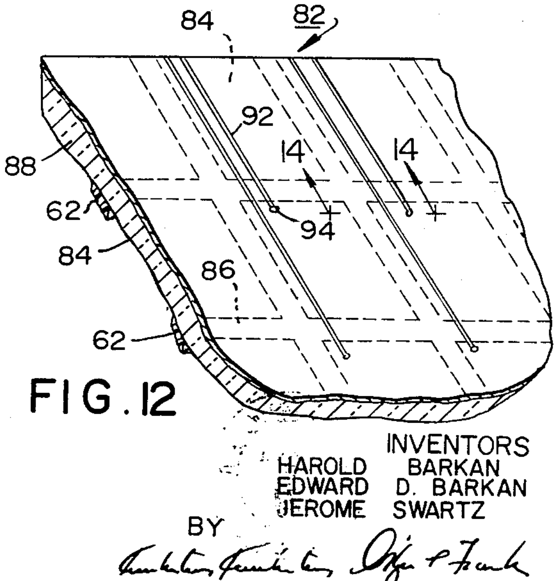
FIG. 12 is a view of the reverse side of the portion of the panel shown in FIG. 11.

In FIGS. 11 and 12 another arrangement for the structuring of the leads is illustrated. The showing of the overlay 82 again is fragmentary and such as to include some marginal contact areas 84 and some internal contact areas. FIG. 11 illustrates the front surface of the overlay 82, this being the surface carrying the contact areas 84, and FIG. 12 illustrates the undersurface of the overlay, i.e., the surface remote from the surface carrying the contact areas. The contact areas 84 are laid down in the same fashion as mentioned with respect to FIG. 10, i.e., by vacuum evaporation deposition or by vacuum sputtering, either method being through a stencil so as to keep the contact areas electrically isolated from one another. However, in this form of the invention no transparent leads are deposited on the same surface of the overlay as that carrying the contact areas. Instead, transparent leads 92 are deposited in the manner described with respect to FIG. 10 on the undersurface of the overlay. Each lead terminates at one end at the perimeter of the overlay and at its other end directly beneath a different contact area. Because the leads are on the undersurface of the electrically non-conductive substrate, the leads do not have to be situated in positions corresponding to the spaces 86 on the front surface of the overlay. Hence, as is clear from inspection of FIGS. 11 and 12, the leads run beneath successive contact areas and such leads can be wider and spaced further apart. As a matter of precaution, the leads, although on the undersurface of the overlay, should be protected by a clear transparent electrically non-conductive coating, e.g., a film of an acrylic resin or silicon monoxide.

Since the leads 92 are on the undersurface of the substrate and are insulated from the contact areas by the substrate, means is included to connect the inner end of each lead to the associated substrate beneath which it terminates. Said means constitutes holes 94 formed in the substrate, as by drilling, the holes being coated with an electrically conductive transparent material such as any one of thos heretofore mentioned. The coating extends from each conductive area 84 to the corresponding inner end of the associated lead 92 so that the coatings are in electrical contact with the leads.

Mention previously has been made of the transparent protective coating provided for the leads 90 in FIG. 10. Said coatings have been indicated in the fragmentary sectional view of FIG. 13 where they are denoted by the reference numeral 96. It will be observed in this figure how the protective coating slightly overlies the perimeters of the contact areas. The thicknesses of the protective coatings, the leads and the contact areas have been exaggerated in this figure because they are actually so thin that, except on a highly enlarged scale, their thicknesses would not be apparent. The coatings 96 are formed in situ, e.g., in liquid form with an electrically non-conductive transparent solid plastic dissolved or suspended in a liquid carrier of a volatile nature so that after application of a liquid film the solvent will evaporate to leave the coatings 96 as a solid formed-in-place layer. Any conventional technique can be used to apply the liquid film such, for instance, as roller coating, brush coating and spraying conveniently done through a stencil. A silicon monoxide coating can be applied to a glass substrate as a powder which when baked liquifies to form a film that hardens upon cooling. The powder has a melting point below the deformation and softening temperatures of the glass of the substrate.

Figure 14:
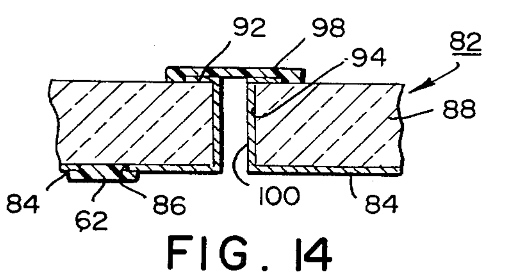
FIG. 14 is a fragmentary sectional view taken substantially along the line 14—14 of FIG. 12 and showing a structure for protecting leads as well as a detail of the electrical connection from a contact area to a lead underlying the substrate.

FIG. 14 shows coatings 98 as applied to the leads 92 illustrated in FIGS. 11 and 12. These coatings are applied in the same fashion as the coatings 96 which relate back to FIG. 10. Also, in FIG. 14 the holes 94 are illustrated more clearly than in FIGS. 11 and 12 as well as the films 100 of transparent electrically conductive nature that are applied to the surfaces of the holes and that run from the illustrated contact area 84 to the inner end of the associated lead 92.

Figure 15:
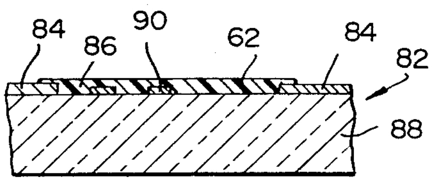
FIG. 15 is a view similar to FIG. 13 but showing another form of construction for the isolating barrier.

In FIG. 15 the leads 92 are shown as protected by a pre-formed coating such as the lattice 62 earlier mentioned herein. This lattice is formed before application as by stamping from a sheet of clear transparent electrically non-conductive synthetic plastic stock, the openings which are to expose the contact areas being blanked out before application of the lattice to he substrate and the remainder of the lattice being so situated as to overlie the transparent leads.

Figure 16:
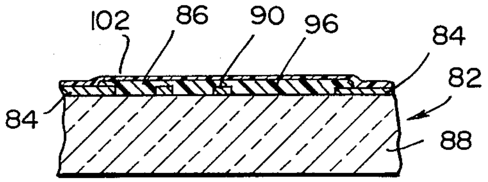
FIG. 16 is a view similar to FIG. 13 and showing a further modified form of the invention wherein a very thin film of electrically non-conductive transparent material overlies the surfaces of the conductive areas remote from the display.

Under certain conditions it is desirable to protect the to-be-touched electrically conductive transparent contact areas 84 against the effects of humidity and atmospheric corrosion without, however, converting the contact areas to proximity types of sensors. Such an arrangement has been illustrated in FIG. 16. This is a fragmentary sectional view similar to FIG. 13 and showing all of the same structure with the addition, however, of a further film 102 which overlies at least the conductive areas 84 and which conveniently also overlies the coatings 96 covering the leads 90. The film 102 is exceedingly thin, e.g., 100 microinches thick. The film is made of an electrically non-conductive transparent material which, however, due to its extreme thinness, provides the equivalent of a direct touching when a finger or an element of equivalent capacitance to a human being is applied to the surface of the overlay above a contact area. The same effect does not ensue when a finger is touched to the film over a lead 90 because of the interposed thicker coating 96. A suitable material for the film 102 is silicon monoxide which in the indicated extreme thinness does not serve as an electrically isolating barrier by itself.

Figure 17A:
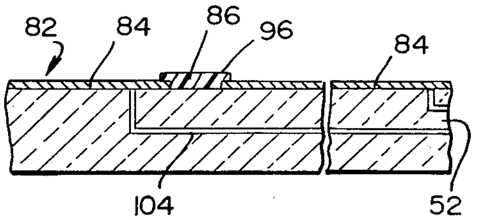

The leads running from the internal contact areas to the perimeter of the overlay need be effectively transparent. Thus, the present invention also contemplates the use of opaque leads such, for instance, as wires. However, where such leads are used they must be very thin so that they do not noticeably interfere with the operator's viewing of the display which underlies the transparent overlay. Such fine wires 104 are shown in FIGS. 17 and **17*a*. By way of example, a diameter of wire which is acceptably small so as not to interfere with the transparency of the overlay is in the order of one to 10 mils in diameter. Said wires are imbedded within the substrate 52 as clearly shown in FIG. 17*a* and, hence, may run beneath successive contact areas 84 as shown in FIG. 17,** the substrate serving to insulate the wires from the contact areas and from one another. The wires can be molded into the substrate during the formation thereof, i.e., during the casting of the substrate, by known technique.

The surface conductivity of the film-type contact areas 84 can vary widely and still operate satisfactorily in carrying out the invention. For example, the surface conductivity can be as little as a few ohms per square and as high as $10^5$ ohms per square. Excellent results are secured where the surface conductivity is in the order of 20,000 ohms per square.

The detailed descriptions of the various embodiments of the interface have, up to this point, included the use of a self-form-maintaining substrate such as a pane of glass or plastic on the exposed (upper) surface of which is deposited very thin films of an electrically conductive transparent material, e.g., from one to fourty millionths of an inch thick, the films constituting the contact areas, being incapable by themselves of sustaining their own form and relying for maintenance in flat form on the rigidity of the underlying substrate. In FIGS. 18 and 19 there is illustrated an alternative arrangement in which electrically conductive transparent conductive areas 106 are individually self-form-maintaining, being in the shape of plaques (wafers) that are thick enough to be stiff. Materials capable of functioning in this manner as plaques and which are electrically conductive and transparent include, by way of example, gallium phosphide, gallium arsenide, indium arsenide and semiconductor polymers.

Said plaques are disposed in openings in a lattice 108 of an electrically non-conductive transparent material such, for instance, as an acrylic resin which is the same thickness as the plaques, the plaques peripherally being cemented to the lattice with a transparent cement such as an acrylic cement. Thereby the overlay has the contact areas extending from the upper to the under surface thereof. The undersurface of such an overlay is provided with a coating 110 which underlies the lattice and the plaques and the top surface with a coating 112 which overlies the electrically conductive transparent leads 114 extending from the different internal plaques to the perimeter of the overlay. As is the case with the overlays previously described, the overlay 82 illustrated in FIGS. 18 and 19 may be provided with a very thin film 116 (see FIG. 20) on its upper surface which covers the upper surface of the plaques as well as the coating 112, this latter film being included solely for the purpose of protecting the exposed surface of the plaques against humidity, atmospheric corrosion or corrosion resulting in spurious electrical paths.

It will be understood by workers skilled in the art that the plaques are sufficiently hard to wear well and resist scratching. The same is true of the film contact areas 84; and, as to both the film contact areas and the plaques, the same will function effectively even when scratched because, with the plaques, contact to the leads is not disturbed by scratching and with the thin film coatings, contact with the leads is not disturbed unless a scratch or scratches isolate the connection of the inner end of the associated lead to the contact area.

One contemplated mode of operation for an interface embodying the present invention is to touch one or more of the contact areas with a human finger or an element having a capacitance in order of that of a human being. It will be appreciated that a finger can touch one or more elements at a time or fingers can touch two or more elements at a time, depending entirely upon the particular use to which the interface is put and the limited zone of contact.

For some uses the contact areas, particularly where contact density is high, may be so small that it will be difficult to touch an individual area with a finger so as to touch only that area and no others. Touching of an individual area in a high density matrix can be accomplished with the use of a slender instrument such, for instance, as a metal probe optionally having a tapered end that terminates in a touching point.

Another form of touching probe 118 is illustrated in FIG. 21. This form has an unusual attribute in that the probe has associated therewith an activatable source of illumination which is energized when the point of the probe touches a contact area, the source of illumination flickering off and on as the probe is moved across an interface in contact therewith, successively touching and leaving contact area. This probe is further unusual in that the source of illumination is connected to the probe and forms a part thereof rather than as a part of an input circuit of a power switch of the types, for example, illustrated, described and claimed in U.S. Pat. Nos. 3,493,791; 3,530,312 and 3,350,310 and U.S. Pat. application Ser. No. 853,858. The advantage of having the source of illumination in the probe is that said source may be seen as it moves over the overlay as it could not be if it were connected in the control position of the switch circuit which is physically remote from the overlay.

More particularly, the probe 118 includes a conductive tube 120, e.g., a metallic tube, having at one end thereof a tapered conductive tip 122, e.g., a metal tip. This tip is inserted in said end of the tube and is insulated therefrom by an electrically non-conductive tubular sheath 124. At the other end of the tube there is provided a source of illumination such as a glow tube 126 which is operated under a condition to require a very low order of current for energization, for instance, in the order of microwatts. In order to operate in this range the glow tube preferably functions in the range described in detail in U.S. Pat. No. 3,530,312, this being at a level between the non-self-maintained discharge point and the beginning of the normal glow discharge region. A typical glow tube which will function in the foregoing manner is an NE–2. A wire 128 connects the conductive tip 122 to one terminal of the glow tube to the sheath. The probe is to be held by a person schematically indicated by the reference numeral 132. The person, and hence the tube 120 and one terminal of the glow tube 126 is grounded.

The glow tube hand-held probe 118 provides a visual feedback mechanism to the user indicating that he has touch activated the switch element connected by the mentioned circuitry to the associated contact area. The probe draws negligible electric power from the internal supply of the switch element which is in the order of microwatts and is connected to the input gate circuitry of the power control switch through the contact area and affiliated lead. This makes the probe very convenient to use in contrast to the connection of readout sources of illumination in the output load circuitry of such switches. With the configuration illustrated only a single glow tube is used and it is physically located above the touched surface of the overlay so that as the point of the probe moves over the overlay the user can tell when the probe is touching a contact area and, indeed, by flickering of the probe, can tell when he is moving from contact area to contact area. The location of glow tubes in the input load circuitry is indicated in U. S. Pat. No. 3,530,312 and it will be appreciated by comparing the description of this patent with the herein described probe that a radically different approach has been used. As in the case of the glow tubes described in U. S. Pat. No. 3,530,312, the glow tube 126 is not in its normal glow discharge region when actuated, this being the region associated with the usual breakdown mechanism of a glow tube, but rather operates in the manner described in said U. S. Pat. No. 3,530,312, i.e., in the region between the non-self-maintained discharge point and the beginning of the normal glow discharge region. Furthermore, when the probe is passed across a matrix and successively touches contact area after contact area, the operator or a suitable mechanism can, by inspection of the flickering of the glow tube, determine how many areas have been contacted and the rate at which the areas are contacted. This is useful in connection with various types of computations.

If desired, the display may be provided with back up sources of illumination, a different one behind each different contact area, e.g., by use of a glow tube in each switch circuit as in U. S. Pat. No. 3,530,312, so that each time a contact area is touched it will be illuminated; this arrangement might be used if the interface is to be used for playing a game, e.g., tic-tac-toe.

The potential impressed upon contact area touched by a human body, which potential is that coupled to the body by its presence in the AC field of the local environment, is of a low order of magnitude. The switches such as those described in detail in the aforesaid Letters Patent and patent application are designed to function when their antennas, which are the contact areas 84 of the present invention, have such a low order of potential applied thereto by touching with a finger and, hence, all of the switches illustrated in the aforesaid patents and application will operate satisfactorily in connection with the present invention with the contact area of this invention forming the antenna of said switch. These switches include pre-set switches, momentary switches, latch-on switches and multiple switches providing pulses of different widths in a single output path. Nevertheless, because the contact in an array of contacts such as is contemplated with the use of the present invention may be fleeting, it is desirable to employ under some circumstances switches which are more sensitive than those illustrated in the aforesaid patents and application.

The circuit for such a more sensitive switch is shown in FIG. 22 and is the same as the circuit shown in FIG. 2 of U. S. Pat. No. 3,493,791 except for the addition of an input end in the form of a current amplifier between the contact area 58 and the silicon control rectifier 134. The portion of the circuit common to that of U. S. Pat. No. 3,493,791 will not be described in detail since it is fully described in the foresaid patent. Instead of having the cathode gate of the silicon controlled rectifier connected to the contact area 58 through an isolating resistor such as the resistor 21 in FIG. 2 of the aforesaid patent, the connection is effected through an N-P-N transistor 136 such as a transistor of the 2N5000 series. The base of the transistor is connected to the contact area 58 through a capacitor 138, e.g., of 120 pf, which is employed for isolation purposes as is the resistor 21 of FIG. 2 of the said patent. A bias capacitor 140 connects the cathode of the silicon controlled rectifier 134 to the side of the capacitor 138 opposite to the side connected to the contact area 58. A suppression resistor may also be used across capacitor 140 for further filtering action as in the said patent. The collector of the transistor 136 is connected to the anode of the silicon controlled rectifier through a blocking diode 142 such as a diode of the 1N4000 series and a limiting resistor 144, e.g., of 220 K ohms. A voltage division resistor 146 is connected between the diode and the resistor 144, which limits voltage to the low voltage three-electrode semiconductor means 136. Resistor 146 is typically 22 K ohms. The emitter of the transistor 136 is connected to the cathode gate of the silicon controlled rectifier. In this configuration the transistor 136 acts as a current amplifier which renders low input currents in the order of 10 microamps or less picked up by the contact area 58 sufficient to render the silicon controlled rectifier 134 conductive and thus to energize the load 148 from a source of power such as an AC source 150. Although the load 148 is shown as resistive it may be inductive (or capacitive) as well. Capacitor 202 across the SCR 134 is used to protect against the dV/dt effects and is in the order of 0.01 mf. Capacitor 201 in the order of 0.1 pf across the gate of SCR 134, is normally for RF suppression, to prevent false firing. However, as in U.S. Pat. No. 3,493,791, if the source is full-wave, rectified by a diode bridge, for example, and capacitor 201 is increased past a certain value (e.g., in excess of 0.1–1 microfarads), SCR 134 will latch-up, as in the ON-stage of an AC OFF-ON switch. Moreover, the half-wave momentary switch as shown in FIG. 22 as connected is a two-wire switch. Any two-wire switch design (desirable for practicality, low cost and simplicity) may be readily converted by way of conducting lead 203 (shown in dotted lines with a break 204 indicated by a dotted "X") to a so-called three-wire design. The converse is not true, which makes two-wire designs more novel and difficult. In the three-wire alternate configuration indicated by the aforesaid dotted modification, the voltage divider to the three-electrode semiconductor means 136 is powered directly from any external source, for example, the same AC source 150 as that which powers the SCR 134 in the two-wire configuration. Thus, once the SCR is turned on, the transistor still sees full voltage in the three-wire configuration, whereas in the two-wire mode it sees only one volt or so forward bias-on drop across the SCR. For internal construction by an original manufacturer, as opposed to retrofitting of a (two-wire) outside switch customer requirement, more voltage is available in the three-wire mode for SCR turn-off circuitry, for example, at the expense of said third wire connection.

In the switches detailed in the aforesaid letters patent and patent application, each antenna forms part of a different switch which would means that there would have to be a number of switches equal to the number of transparent contact areas in an overlay array when practicing the present invention. Such an arrangement would be entirely acceptable and, indeed, is contemplated where the array does not include an overly large number of contact areas, for instance, in arrays up to 4 × 4 (four contact areas in each row and four contact areas in each column). However, where there is a high density of contact areas, for instance, in large arrays, and by large there is meant any array greater than 4 × 4 and embracing, for example, 200 × 200 and even greater numbers of contact areas, as a matter of economy it would be poor commercial practice to have one switch associated with each contact area, that is to say, with each antenna. Hence as a further feature of the present invention there can be utilized with contact areas such as have been described in detail hereinabove the well-known *X,Y* matrix technique.

To utilize this *X,Y* matrix technique each *X* row and each *Y* column of the contact areas is associated with a different switch. Thus, if there are 100 *X* rows and 100 *Y* columns there would be 100 *X* + 100 *Y* switches or 200 switches in all. By way of example, one of the *X* switches would have as an antenna therefor all of the contact areas in a given *X* row, another *X* switch would have associated therewith as an antenna all of the contact areas in another *X* row, and, similarly, one *Y* switch would have associated therewith as an antenna all of the contact areas in a given *Y* column, etc. Thus, using the *X,Y* matrix technique, only $M + N$ switches are required with $M \times N$ contact areas and there would be associated with the touch switches conventional combinatorial logic circuitry such, for instance, as "and" gates to provide the required number of $M \times N$ outputs.

To elucidate further, if a contact area in the second *X* row and fourth *Y* column were touched, the 2 *X* switch and the 4 *Y* switch would be energized and the outputs from these two switches would control an "and" gate for an output corresponding to the 2 *X*/4 *Y* contact area. This represents a saving of $M \times N - (M + N)$ switches. In an exemplificative 6 × 8 array, instead of having 48 switches, one for each of the contact areas, there would be needed only 14 switches with 48 outputs from the associated logic circuitry. Quite apparently, the larger the array the greater the saving in the number of switches, although a larger number of "and" gates (one for each of the contact areas) would have to be employed. The circuitry and components of the "and" gates are far simpler and less expensive than the circuitry and components of the switches, so that real saving is achieved.

However, it is quite obviously not possible to have each actual transparent contact area simultaneously connected to all other areas in the same *X* row and *Y* column because this would effectively short circuit the entire keyboard. Therefore, in accordance with the present invention where the *X, Y* matrix technique is to be employed, the contact areas are differently constructed from those previously described.

One such construction is illustrated in FIG. 23 wherein a portion only of an overlay 152 is shown. In this overlay each transparent contact area is indicated by the reference numeral 154 and it will be seen that each contact area is composed of two electrically and physically discrete contact sub-areas 156, 158. These contact sub-areas are constructed in the same manner as the contact areas 58 and 84 hereinabove described. That is to say, each contact sub-area constitutes an electrically conductive transparent film, the two contact sub-areas being effectively coextensive with a corresponding portion of the visual display that underlies the contact area 154. The contact areas 154 have been shown in an *X*, *Y* technique and constructed in accordance with the present invention; the contact areas 154 are much greater in their linear dimension than the spacing between adjacent contact areas, e.g. 100 times greater.

The two contact sub-areas 156,158 of each contact area 154 are immediately adjacent one another, the spacing therebetween only being sufficient to provide electrical insulation between the sub-areas. Preferably, moreover, for a reason which will be pointed immediately below, the contact sub-areas 156, 158 are of such configuration and mutual arrangement that they are interleaved, e.g., interdigitated; for this purpose, each contact sub-area is of such geometric outline as to provide thin fingers within a large enveloping areal outline which enveloping areal outline is considerably greater than the area of a square having the same actual area as the contact sub-area. Thus, each contact area could be in the form of a flat helix, i.e., spiral, and the associated contact sub-area, likewise in the form of a spiral, the turns of which are interleaved with the turns of the first contact sub-area.

As shown herein, each contact sub-area is dentated, that is to say, in the form of a rake, with the teeth of the rakes interleaved. The purpose of this type of configuration and mutual arrangement for the associated contact sub-area pairs of a given contact area is to cause portions of each contact sub-area throughout the greater part of the entire contact area to be located adjacent corresponding portions of the affiliated other contact sub-area. Phrased differently the zone of demarcation between the sub-areas is not a single straight line delineating two oblong areas, but, rather, is a tortuous line that meaders through the entire contact area. Thereby, when a person touches any one of such contact areas he will touch both contact subareas. One of the contact sub-areas is an *X* contact sub-area and the other contact sub-area is a *Y* contact sub-area.

All of the *X* contact sub-areas in any given *X* row are connected by a transparent electrically conductive lead 160, and, similarly, all of the *Y* column contact sub-areas in any given *Y* column are connected by a transparent electrical conductive lead 162. The leads 160, 162 extend to the periphery of the transparent electrically non-conductive substrate or supporting panel 164 on which the contact sub-area films are disposed. Obviously, the *X* and *Y* leads 160, 162 must cross over one another as viewed in plan. However, they must not touch or the entire overlay 152 would be short circuited.

To prevent short circuiting a suitable insulating technique and method of manufacture are employed. For example, referring to FIGS. 23 and 24, first all of the *X* row contact sub-areas 156 and the associated leads 160 are applied as films by vacuum deposition through a stencil. Thereafter an insulating film 166, e.g., of silicon monoxide, is applied through a stencil over the leads 160 and around the long edge and sides of the base of the rake-shaped sub-areas 156 and the outer edges of the outer teeth thereof. Then the Y column sub-areas and affiliated leads 162 are deposited by vacuum deposition through a stencil in the indicated locations, after which another insulating film 168, e.g., of silicon monoxide, is applied over the *Y* leads 162 and around the long edge of the base of the rake and the sides of the base of the rake and the spaces between the interleaved teeth of the rake. As observed previously, the insulating film is transparent. Thus, the entire overlay 152 is transparent and the sundry contact areas 154 composed of the sub-areas cover essentially the entire underlying visual display (not shown). The width of the teeth and bases of the rakes are so selected as to be less than the contact zone of the touching implement, e.g., a human finger or the tip 122 of the probe so that portions of both sub-areas will be simultaneously touched.

In FIGS. 25 and 26 an alternate arrangement has been shown for the same contact area 154 composed of the contact subareas 156,158. The *X* and *Y* connections are effected here by *X* leads 170 and *Y* leads 172 situated on opposite sides of the substrate 174. The *X* and *Y* sub-areas are deposited in the manner hereinabove described with the *X* leads 170 being deposited at the same time as the *X* sub-areas 156 and the *Y* contact sub-areas 58. The *Y* leads are thereafter deposited. Each *Y* sub-area is connected to the back of the substrate by a transparent electrically conductive coating 176 covering the surface of a front-to-back opening the leads from each such *Y* sub-area. At the back of the panel the coatings 176 are in electrical and physical contact with the associated *Y* leads 172. The peripheral edges of the *X* and *Y* sub-areas and the spaces between the interleaved portions thereof are covered by an insulating film 178 of transparent material, the same film also covering the *X* leads 170. On the back of the panel the *Y* leads 172 are covered by a transparent electrically non-conductive film 180 which also may cover the balance of the back of the panel. The *X* and *Y* leads are brought out to the periphery of the panel and, as in the case of the overlay 152, are connected to the *X*, *Y* matrix circuitry in the fashion hereinabove described.

The particular technique described in detail with reference to FIGS. 23 – 26 is particularly useful for finger touching of the contact areas because even slight pressure of the finger against the overlay causes the flesh of the finger to flatten sufficiently to touch *X* and *Y* contact sub-areas of any given contact area simultaneously as is necessary for an *X*, *Y* matrix technique. The same arrangement of sub-areas also will work well with the probe 118 of FIG. 21. However, when employed in conjunction with an *X*, *Y* matrix arrangement the tip of the probe is provided with a flat touching surface of sufficient areal extent to concurrently contact more than one tooth simultaneously so that in all of the positions of the probe on a given contact area the conductive point thereof will touch at least portions of two associated contact sub-areas.

The only type of visual display that has been mentioned to this point is a printed graphic display such as the display material 56 printed on the display support 54 and illustrated in FIG. 3. However, the invention is not restricted to any such display as has been pointed out hereinabove. The displays can be static or dynamic and can come from any source known to the visual art. Different types of displays are illustrated in FIGS. 27, 28 and 29.

More particulary, in FIG. 27 the display is generated by a moving picture projector 182 which casts a dynamic display on the back of an overlay 184 which can be of any one of the types previously described. The rear surface of the overlay preferably is frosted so as to enable a visible image to be formed thereon, which image can be seen by an operator viewing the overlay from the front. The overlay then is used in any of the manners mentioned before, e.g. touching contact areas 186 by hand or with an implement or with a special probe such as described with reference to FIG. 21. The number of contact areas 186 illustrated is merely exemplificative, more or less can be utilized. Their thickness has been greatly exaggerated for the purpose of illustration. The leads and insulating films have been omitted for the same purpose. In FIG. 28 a still projector 188 is employed to cast a motionless image on the back of an overlay 190 whose rear surface likewise is frosted. It will be appreciated that with a still projector, even though a display is static, it can be readily changed, i.e., substituted by other displays, so that the same overlay can be used with a large number of displays under the control of the operator. The overlay 190 is illustrated in the same schematic fashion as the overlay 184.

In FIG. 29 the display is created by a cathode ray tube 192, the display being formed on the face of the tube by a gun 194 and deflecting plates 196 in a manner well known in the art. The display is formed on the inner surface of the face of the tube, e.g., on a phosphor screen, and the overlay constitutes the front face of the tube, the conductive areas 198 being emplaced on the front surface of the front face in any one of the manners heretofore described. Thus, the front face of the cathode ray tube becomes an overlay 200 and can be touched by a person's finger or other implements such as have been mentioned before. Said overlay has been likewise schematically shown.

The FIG. 29 form of the invention is particularly useful in systems where the visual display of the cathode ray tube is remote from a utilization mechanism or the arrangement for feeding information to the cathode ray tube. The outputs from the contact areas on the face of the cathode ray tube can be transmitted back to a proper point where these outputs can be utilized either for processing, storage or feed-back to the visual display on the cathode ray tube after being appropriately modified. Typical of such utilizations are voting stations in individual homes, the voting stations being useful for election broadcasting, or television program rating, or consumer approval or rejection of products. Another purpose for which the present invention may be employed where a cathode ray tube is used for the visual display is to aid in teaching children at home. An example thereof would be in connection with the present well-known "Head Start" program. The same principle can be applied to teaching handicapped children at home. It will, of course, be understood that the cathode ray tube in these cases can readily be the cathode ray tube employed in a home television set modified only to include the present novel transparent overlay plus appropriate circuitry such as described above. The circuitry may further include a radio or telephone link back to a utilization mechanism.

Although the present novel transparent overlay can be adapted to any areal layout, the fixed angular format of a clock structure (FIG. 30) is one of the simplest and most natural transparent display interfaces for the present invention is timing applications in which the structure leads itself to standardization of manufacture. Fixed angular increments can correspond to 30° per hour radial sector-shaped transparent contact areas or areas of any other radial extent or further division into 6° increments to correspond to 60 minutes of time, for utilization in multiple-process industrial timing controls or simple stop-watch monitoring applications. The standard three fourth inch spacing between centers on a typewriter keyboard also allows the manufacturing technique for the present novel interface to be standardized and of any rectangular extent.

It thus will be seen that there are provided devices which achieve the various objects of the invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense. We claim:

1. In combination, a transparent touch actuated interface and a static display means, said interface comprising plural transparent electrically conductive stationary area touch activatable elements each of which is electrically and functionally independent of and discrete from all the other elements, an electrically non-conductive clear transparent substrate, all of said elements being supported by said substrate, each element being disposed in spaced immediate adjacency with adjoining elements, said elements being mutually located so as to extend in different directions with respect to one another in the plane of said substrate so as jointly to present an effectively unitary conductive transparent area, solid state switches of which said areal elements are the actuating elements, transparent electrically non-conductive means separating said elements, and leads supported by said substrate for connecting said areal elements to said switches, said switches being so constructed that when an areal element is touched by a human finger a signal input is fed over a lead associated with said areal element to a switch associated with said areal element to actuate the same, the plural transparent electrically conductive stationary areal touch activatable elements constituting an overlay covering and immediately above the display means and substantially coextensive with the display means, each areal element being disposed above and being substantially coextensive with a corresponding area of the display means.

2. A combination as set forth in claim 1 wherein an extremely thin electrically non-conductive transparent film covers the broad surfaces of said overlay remote from the display means, the leads and the transparent electrically non-conductive means separating said elements.

3. A combination as set forth in claim 1 wherein the transparent conductive stationary areal elements are thick enough to be self-form-maintaining.

4. A combination as set forth in claim 3 wherein the transparent electrically non-conductive means constitutes a lattice with through openings in which the areal elements are disposed and fill.

5. A combination as set forth in claim 1 wherein the areal elements are of sectorial configuration and are arranged around a common center with the apices of the elements adjacent the center.

6. A combination as set forth in claim 5 wherein the elements conjointly define a circle.

7. A combination as set forth in claim 1 wherein the areal elements and leads are supported on the electrically non-conductive transparent substrate, and wherein the leads constitute conductors embedded in the substrate.

8. A combination including an interface as set forth in claim 1 wherein the electrically conductive transparent film elements and their supporting substrate are functionally separate from the display means.

9. A combination as set forth in claim 1 wherein certain of the areal elements adjoin the perimeter of the interface and others of the areal elements are spaced from the perimeter of the interface and wherein the leads from the said other elements extend between the perimetral areal elements.

10. A combination as set forth in claim 9 wherein the leads from the said other elements are located on the same surface of the substrate as said elements.

11. A combination as set forth in claim 1 wherein certain of the areal elements adjoin the perimeter of the interface and others of the areal elements are spaced from the perimeter of the interface and wherein the leads from said other elements extend partially through the substrate and in part are supported upon the surface of the substrate remote from the films.

12. A combination as set forth in claim 1 in which the solid switches are of the touch type, each including a control electrode, and which combination further includes a hand-held electrically conductive touching element, said conductive touching element including an electrically conductive portion adapted to be touched to the areal elements, an electrically energizeable source of illumination and a hand engageable electrically conductive member, said portion, said source of illumination and said member being connected in series whereby each time said portion touches a different areal element said source of illumination is energized, and said source of illumination is deactivated when said member is out of contact with an areal element.

13. A combination as set forth in claim 12 wherein the source of illumination is energizeable by power in the order of microwatts.

14. A combination as set forth in claim 12 wherein said member is a hollow sleeve having a source of illumination at an end remote from the interface and wherein the portion is at the other end of the sleeve being insulated and protuding therefrom.

15. A combination as set forth in claim 12 wherein the source of illumination is a neon glow tube.

16 A combination as set forth in claim 1 in which each solid state switch constitutes an SCR power handling device including a control gate and power terminals, and a three-element transistor including a pair of input and output terminals connected respectively to the control gate and a power terminal of the SCR and a control gate connected to the lead.

17. A combination as set forth in claim 1 wherein the elements are relatively disposed in orthogonal relationship.

18. A combination as set forth in claim 1 wherein the area of the space between said elements is less than the order of about 1/10 percent of the area covered by said elements.

* * * * *